US009042584B2

(12) United States Patent
Kwon

(10) Patent No.: US 9,042,584 B2
(45) Date of Patent: May 26, 2015

(54) HEARING AID SYSTEM FOR REMOVING FEEDBACK NOISE AND CONTROL METHOD THEREOF

(71) Applicant: Algor Korea Co., Ltd., Gwangju (KR)

(72) Inventor: You Jung Kwon, Gwangju (KR)

(73) Assignee: ALGOR KOREA CO., LTD., Gwangju (KR)

( * ) Notice: Subject to any disclaimer, the term of this patent is extended or adjusted under 35 U.S.C. 154(b) by 0 days.

(21) Appl. No.: 14/022,314

(22) Filed: Sep. 10, 2013

(65) Prior Publication Data

US 2014/0072156 A1 Mar. 13, 2014

(30) Foreign Application Priority Data

Sep. 11, 2012 (KR) ........................ 10-2012-0100598

(51) Int. Cl.
*H04R 25/00* (2006.01)
*H04B 15/00* (2006.01)
*G10K 11/00* (2006.01)

(52) U.S. Cl.
CPC ............ *G10K 11/002* (2013.01); *H04R 25/453* (2013.01); *G10K 2210/506* (2013.01)

(58) Field of Classification Search
CPC ............. H04R 25/453; H04R 2225/43; H04R 25/407; H04R 25/505; H04R 2430/03; H04R 3/005; H04R 3/02; H04R 2460/03; H04R 25/356; H04R 1/1083; H04R 1/406; H04R 2410/01; H04R 2430/20; H04R 25/43; H04R 3/002; H04R 5/033; H04R 1/1041
USPC ......... 381/317, 318, 320, 321, 93, 94.2, 94.3, 381/106, 108
See application file for complete search history.

(56) References Cited

U.S. PATENT DOCUMENTS 7,206,423 B1 * 4/2007 Feng et al. .................... 381/312
2014/0072156 A1 * 3/2014 Kwon ........................... 381/318

FOREIGN PATENT DOCUMENTS

KR 10-2001-0008008 2/2001

* cited by examiner

*Primary Examiner* — Davetta W Goins
*Assistant Examiner* — Phylesha Dabney
(74) *Attorney, Agent, or Firm* — Kile Park Reed & Houtteman PLLC

(57) ABSTRACT

Provided is a hearing aid system including: a first processor that fast Fourier transforms N input signal tone data output from an input buffer memory, and then executes nonlinear compression; a second processor that inverse fast Fourier transforms amplitude spectrum data; an output buffer memory that stores the voice signal tone data, until the number of the voice signal tone data is N; and a digital-to-analog (D/A) converter that converts the digital voice signal tone data into an analog signal, to then output the analog signal to a receiver. Thus, certain ambient noise due to an acoustic feedback signal and a narrow frequency band that occur in a hearing aid is removed, to thus reduce discomforts due to the acoustic feedback noise of the hearing aid for hearing aid users, and to thereby significantly improve speech discrimination.

9 Claims, 22 Drawing Sheets

30 = EAR SHELL

40 = BATTERY DOOR

HEARING AID SYSTEM FOR REMOVING FEEDBACK NOISE AND CONTROL METHOD THEREOF

TECHNICAL FIELD

The present invention relates to a hearing aid system for removing feedback noise and a control method thereof, and more particularly to, a hearing aid system for removing feedback noise and a control method thereof, in which certain ambient noise due to an acoustic feedback signal and a narrow frequency band that occur in a hearing aid is automatically removed and a tone color is changed according to the preference of a wearer of the hearing aid, to thereby significantly improve speech discrimination.

BACKGROUND ART

In general, hearing aids are hearing devices to assist hard-of-hearing persons who have a weak hearing capability to hear better external sound. However, since the hearing aids are so small compact devices that users can wear the hearing aids in their ears or behind their ears in the normal use, the hearing aids will be programmed individually by experts for fitting hearing aids according to prescription in order to amplify the frequency range that it is difficult for users to recognize before use of the hearing aids. Here, as shown in FIG. 1, even if a signal is amplified by a digital amplifier in a digital signal processor (DSP) integrated circuit (IC) chip (D), the digital hearing aid may change an operational status of the digital amplifier via a volume controller (VC), in order for a user to adjust the degree of amplification according to a user hearing capability. Here, most of the volume controllers (VC) are variable resistor type volume controllers, or memory change digital button switches. However, according to the problem of the above-mentioned digital hearing aid, when the hearing aid is inserted and worn in the ear, there is a gap between the outer surface of the hearing aid and the surface of the skin of the ear canal, a sound output from a hearing aid receiver (R) is not delivered to the eardrum only, but leaks through the gap, to then be input to a hearing aid microphone (M) again and to thereby cause an acoustic feedback noise problem (F). The acoustic feedback noise is usually a "beep" sound, to cause very severe discomfort to the hearing aid user and to disable the hearing aid user to boost and hear others' voice. In addition, if a user who uses the hearing aid says or chews food at a state of having worn the hearing aid, the internal diameter of the ear canal becomes wider due to the structural properties of the ear canal, and thus feedback noise cannot but occur. Therefore, the above-mentioned conventional digital hearing aids require measures of removing the feedback noise.

Here, as the conventional technology related to the hearing aids, the Korean Patent Laid-open Publication No. 10-2001-0008008 on Feb. 5, 2001 entitled Automatic fitting method of Hearing aids was proposed by the applicant Ms. Yoonjoo, Sim.

Referring to FIG. 2, a conventional hearing aid having an acoustic feedback function, includes an analog-to-digital (A/D) converter 71 that converts an analog input signal tone input from a microphone (M) 70 into a digital signal to output the conversion result;

an input buffer memory 72 that stores the digital input signal tone data output from the A/D converter 71, to then sequentially output the stored digital input signal tone data;

a subtracter 74 that subtracts a y scalar signal (y) of a feedback buffer memory 73 for eliminating a feedback signal, from input signal tone data (d) output from the input buffer memory 72;

an intermediate buffer memory 75 that stores the input signal tone data (e) output from the subtracter 74, to then sequentially output the stored input signal tone data;

an amplifier 76 that amplifies the input signal tone data output from the intermediate buffer memory 75, to then output the amplified result;

an output buffer memory 77 that stores the input signal tone data output from the amplifier 76, to then sequentially output the stored input signal tone data;

a digital-to-analog (D/A) converter 79 that converts the digital input signal tone data from which feedback noise has been removed and that is output from the output buffer memory 77, into an analog signal, to then output the analog signal to a receiver 78;

a feedback output buffer memory 80 that makes part of the amplified signal output from the output buffer memory 77 feedback to then be stored as x vector data;

a coefficient updating unit 81 that updates the coefficient of the input signal tone data output from the intermediate buffer memory 75;

a counter 82 that stores N coefficients of the updated input signal tone data output from the coefficient updating unit 81 as w vector, to then output the stored w vector; and a multiplier 83 that multiplies x vector data of the feedback data output from the feedback output buffer memory 80, by the w vector data of the counter 82, to then output a y scalar value to the feedback buffer memory 73.

On the other hand, the conventional hearing aid having the acoustic feedback function operates that the A/D converter 71 converts an analog input tone signal input from a microphone (M) 70 into a digital signal to then output the conversion result to the input buffer memory 72. In addition, the input buffer memory 72 stores the digital input signal tone data output from the A/D converter 71, to then sequentially output the stored digital input signal tone data to the subtracter 74. In this case, the subtracter 74 subtracts a y scalar signal (y) of the feedback buffer memory 73 for eliminating a feedback signal, from input signal tone data (d) output from the input buffer memory 72, to then output the resultant signal (e=d−y) to the intermediate buffer memory 75. The intermediate buffer memory 75 stores the input signal tone data (e) output from the subtracter 74, to then sequentially output the stored input signal tone data to the amplifier 76 and the coefficient updating unit 81. In addition, the amplifier 76 amplifies the input signal tone data output from the intermediate buffer memory 75, to then output the amplified result to the output buffer memory 77. In addition, the output buffer memory 77 stores the input signal tone data output from the amplifier 76, to then sequentially output the stored input signal tone data to the digital-to-analog (D/A) converter 79 and the feedback output buffer memory 80.

In this process, the feedback output buffer memory 80 temporarily stores the signal amplified by the amplifier 76 prior to being output to the receiver 78 through the D/A converter 79. Here, the data stored in the feedback output buffer memory 80 is stored as the x vector of not single digital data but N data. According to a storing sequence of the feedback output buffer memory 80, the oldest data is in the first stage of the feedback output buffer memory 80, the latest data is located at the end of the feedback output buffer memory 80, the oldest data is deleted every sampling time, and then the next oldest data is transferred to the first stage. The counter 82 stores N coefficients output from the coefficient updating unit 81 as w vector, to then output the stored w vector to the multiplier 83. The x vector data of the feedback output buffer memory 80 is also output to the multiplier 83. Accordingly, the multiplier 83 multiplies x vector data output from the feedback output buffer memory 80, by the w vector data of the counter 82, to then output a y scalar value to the feedback buffer memory 73.

In this process, if the output tone output from the receiver 78 is fed back and then input back to the microphone 70 to thus cause acoustic feedback, the feedback noise is amplified again to thus cause further amplified feedback noise and to thereby repeat a vicious cycle of feedback noise.

Thus, in order to reduce or eliminate the feedback noise, the previously calculated y scalar (y) is subtracted from the feedback input tone (d), and the subtracting result (e=d−y) is input to the amplifier 76. Here, the subtracting result (e) that is obtained by subtracting the y scalar (y) from the input tone (d) is removed by updating the w vector every sampling time in the coefficient updating unit 81 from the x vector of feedback output buffer memory 80 and the w vector of the counter 82, and then moving the resultant N updated w vector data to the counter 82.

However, the conventional hearing aid having the acoustic feedback function inevitably needs 2N+1 multiplications and additions among the entire operation to eliminate the feedback noise, because at least 128 integers are used as a value of N in most cases. As a result, a problem of causing a large load to the hearing aid system occurs due to the entire operations. In addition, certain ambient noise due to an acoustic feedback signal and a narrow frequency band is not normally removed, to thus cause discomforts to the hearing aid user due to the acoustic feedback noise as well as cause a problem of significantly lowering speech discrimination.

DISCLOSURE

Technical Problem

To solve the above problems, it is an object of the present invention to provide a hearing aid system for removing feedback noise and a control method thereof, in which certain ambient noise due to an acoustic feedback signal and a narrow frequency band that occur in a hearing aid is removed, to thus reduce discomforts due to the acoustic feedback noise of the hearing aid for hearing aid users, and to thereby significantly improve speech discrimination.

It is another object of the present invention to provide a hearing aid system for removing feedback noise and a control method thereof, in which output sound pressure of a hearing aid is processed differently by frequency channels within a dynamic range of a hearing threshold value of a hard-of-hearing person, and an acoustic feedback is automatically removed.

Technical Solution

To accomplish the above object of the present invention, according to an aspect, there is provided a hearing aid system comprising:

an analog-to-digital (A/D) converter that converts an analog input signal tone, that is, speaker's voice signals input from a microphone of the hearing aid system into a digital signal;

an input buffer memory that stores the digital input signal tone data output from the A/D converter, to then output the stored digital input signal tone data when the number of the stored digital input signal tone data is set as an integer N;

a first processor that fast Fourier transforms N input signal tone data output from the input buffer memory, and then executes nonlinear compression;

a second processor that inverse fast Fourier transforms amplitude spectrum data that has been non-linear compressed and input from the first processor, and then outputs the inverse fast Fourier transformation result;

an output buffer memory that stores the voice signal tone data from which feedback noise has been removed from the second processor, until the number of the voice signal tone data is N, to then output the stored voice signal tone data, a digital-to-analog (D/A) converter that converts the digital voice signal tone data from which feedback noise has been removed and that is output from the output buffer memory, into an analog signal, to then output the analog signal to a receiver; and a power supply unit for supplying power to the hearing aid system.

According to another aspect, there is provided a control method for a hearing aid system comprising:

a first process of fast Fourier transforming N input signal tone data input from a microphone of a hearing aid system from a time domain to a frequency domain in a FFT (fast Fourier transform) unit;

a second process of calculating only an amplitude component separately from the input signal tone data that has been fast Fourier transformed in the first process, and converting the amplitude component from a linear unit to a dB unit in a decibel (dB) converter;

a third process of executing non-linear compression of the amplitude spectrum signal calculated after the second process, by a step set by a signal compressor;

a fourth process of adaptively changing a gain of the non-linear compression signal for each frequency channel after the third process, depending on an input signal level and outputting the adaptively changed gain in an adaptive notch filter;

a fifth process of executing a gain variation change of the amplitude spectrum whose gain has been adaptively changed in the fourth process, and then inversely converting dB unit amplitude spectrum data whose maximum output has been limited into a linear unit in an inverse dB converter; and a sixth process of inversely fast Fourier transforming the inversely converted amplitude spectrum data in an inverse fast Fourier transform (iFFT) unit from a frequency domain to a time domain after the fifth process, and converting the digital voice signal tone data whose feedback noise has been removed into an analog signal, to then output the analog signal.

According to still another aspect, there is provided a control method for a hearing aid system comprising:

a programming algorithm execution process of processing a digital signal with respect to 128 input signals per frame, moving 32 final voice signals that have been first input among 128 pieces of final frame data whose spectrum modulation algorithm signal processing has been completed to an output buffer memory, for a 0.0625 msec sampling time as soon as 32 new voice signals are input through an input buffer memory, and then synchronizing and outputting 32 output buffer signals to a receiver for the 0.0625 msec sampling time, to thus prevent dropouts of some signals from occurring due to a signal processing time of a central processing unit (CPU);

an inverse fast Fourier transform algorithm execution process of fast Fourier transforming 128 pieces of data input from a microphone after the programming algorithm execution process, executing a spectrum amplitude modulation signal processing process by converting 65 pieces of complex data into a log unit (dBHL), re-converting the spectrum amplitude modulation signal from the log unit (dBHL) to 128 odd symmetrical complex units, and executing an inverse fast Fourier transforming process of the re-converted 128 complex units to obtain 128 pieces of completed final output voice data; and a spectrum amplitude modulation algorithm execution process of detecting a spectrum of voice signals that are input continuously for 200 msec, and considering the voice signals as ambient noise if the detected spectrum is smaller than a consonant threshold value level curve of a conversation sound, after the inverse fast Fourier transform algorithm execution process, to thereby prevent a hard-of-hearing person from being continuously exposed to the ambient noise through attenuation rather than amplification and make the hard-of-hearing person focus on only a voice oriented to the conversation sound.

Advantageous Effects

As described above, the present invention provides a hearing aid system for removing feedback noise and a control method thereof, in which certain ambient noise due to an acoustic feedback signal and a narrow frequency band that occur in a hearing aid is removed, and a tone color is changed according to the preference of a wearer of the hearing aid, to thus provide an effect of reducing discomforts due to the acoustic feedback noise of the hearing aid for hearing aid users, and a speech sound is relatively emphasized to make the wearer hear the amplified sound, thereby provide an effect of significantly improving speech discrimination.

In addition, the present invention differently processes output sound pressure of a hearing aid by frequency channels within a dynamic range of a hearing threshold value of a hard-of-hearing person, and automatically removes an acoustic feedback, to thereby provide an effect of providing an optimal hearing aid adaptive to hearing of a hard-of-hearing person.

DESCRIPTION OF DRAWINGS

The above and other objects and advantages of the present invention will become more apparent by describing the preferred embodiment thereof in detail with reference to the accompanying drawings in which.

BEST MODE

Hereinbelow, hearing aid systems and control methods thereof, according to embodiments of the present invention will be described with reference to the accompanying drawings.

First Embodiment

Figure 1:
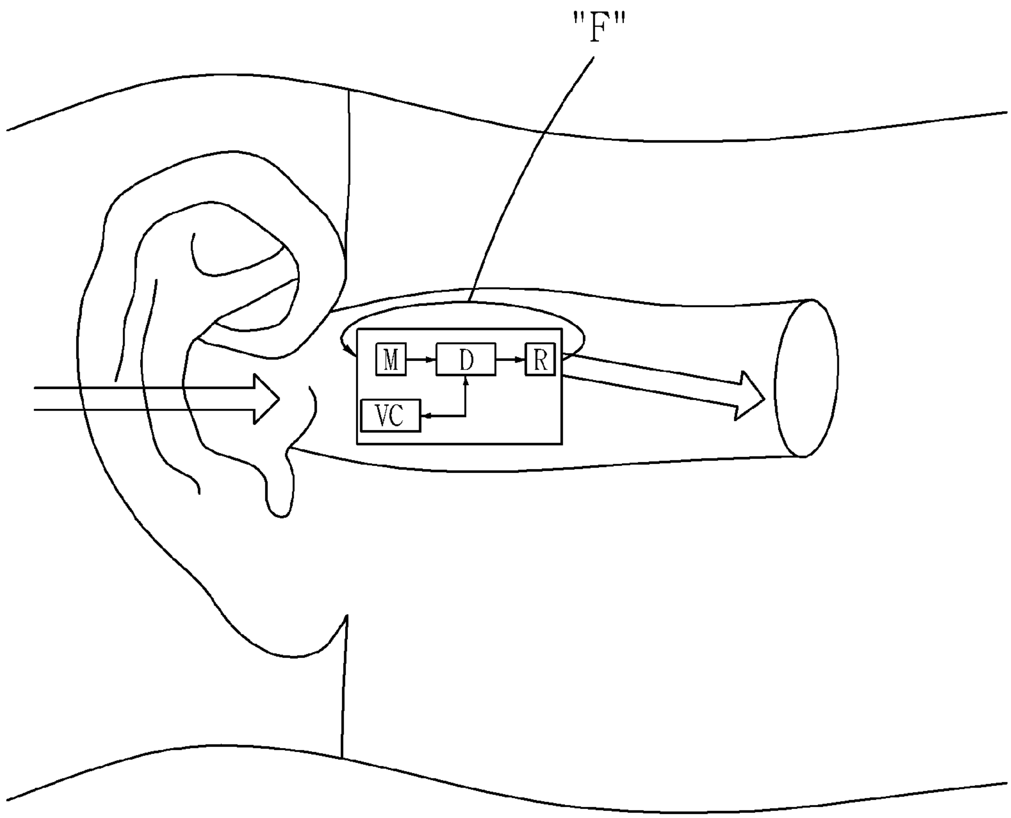
FIG. 1 (PRIOR ART)
FIG. 1 illustrates a typical hearing aid device.
Figure 2:
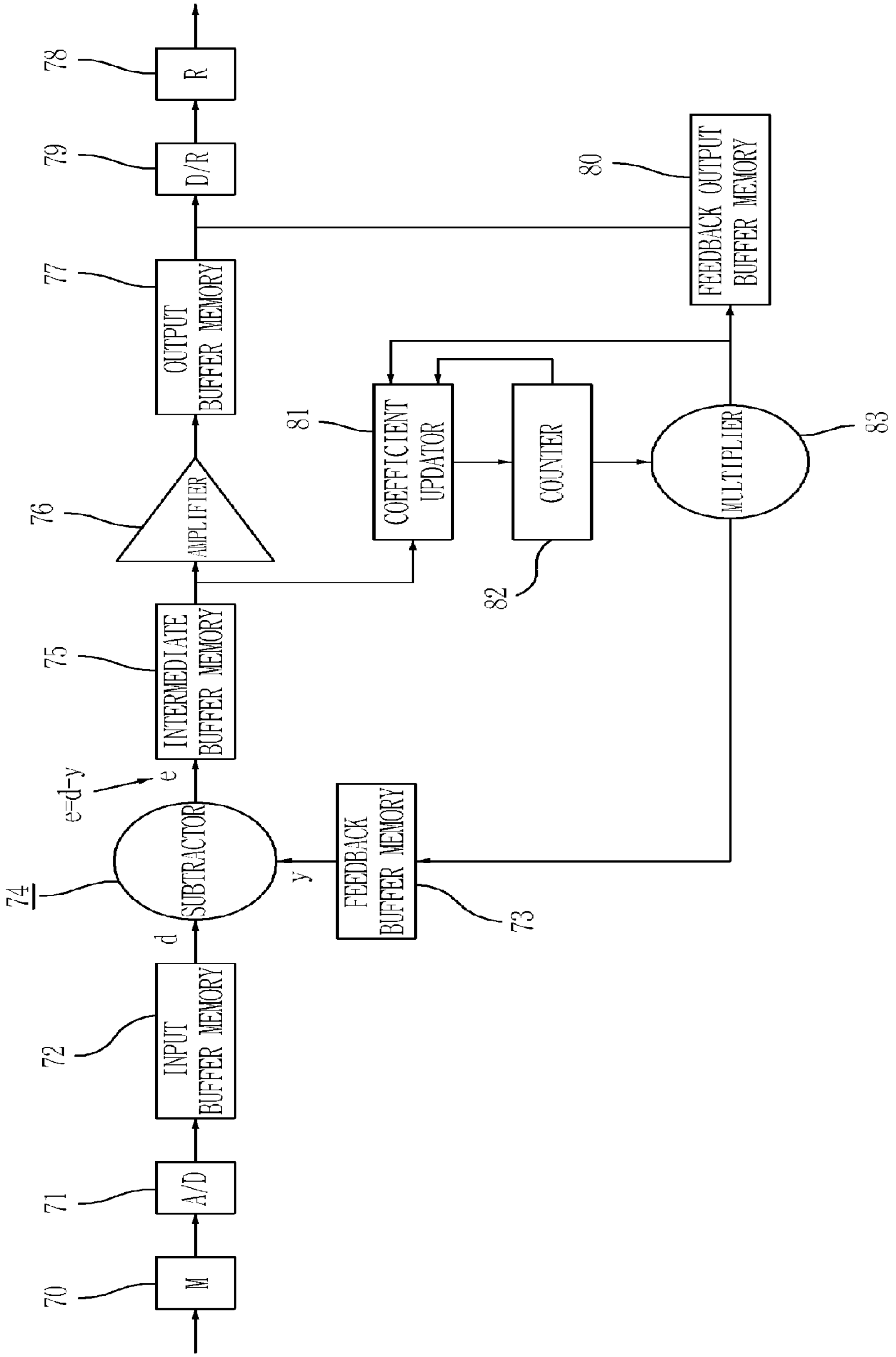
FIG. 2(PRIOR ART)
FIG. 2 is a block diagram showing a conventional acoustic feedback removed digital hearing aid device.
Figure 3:
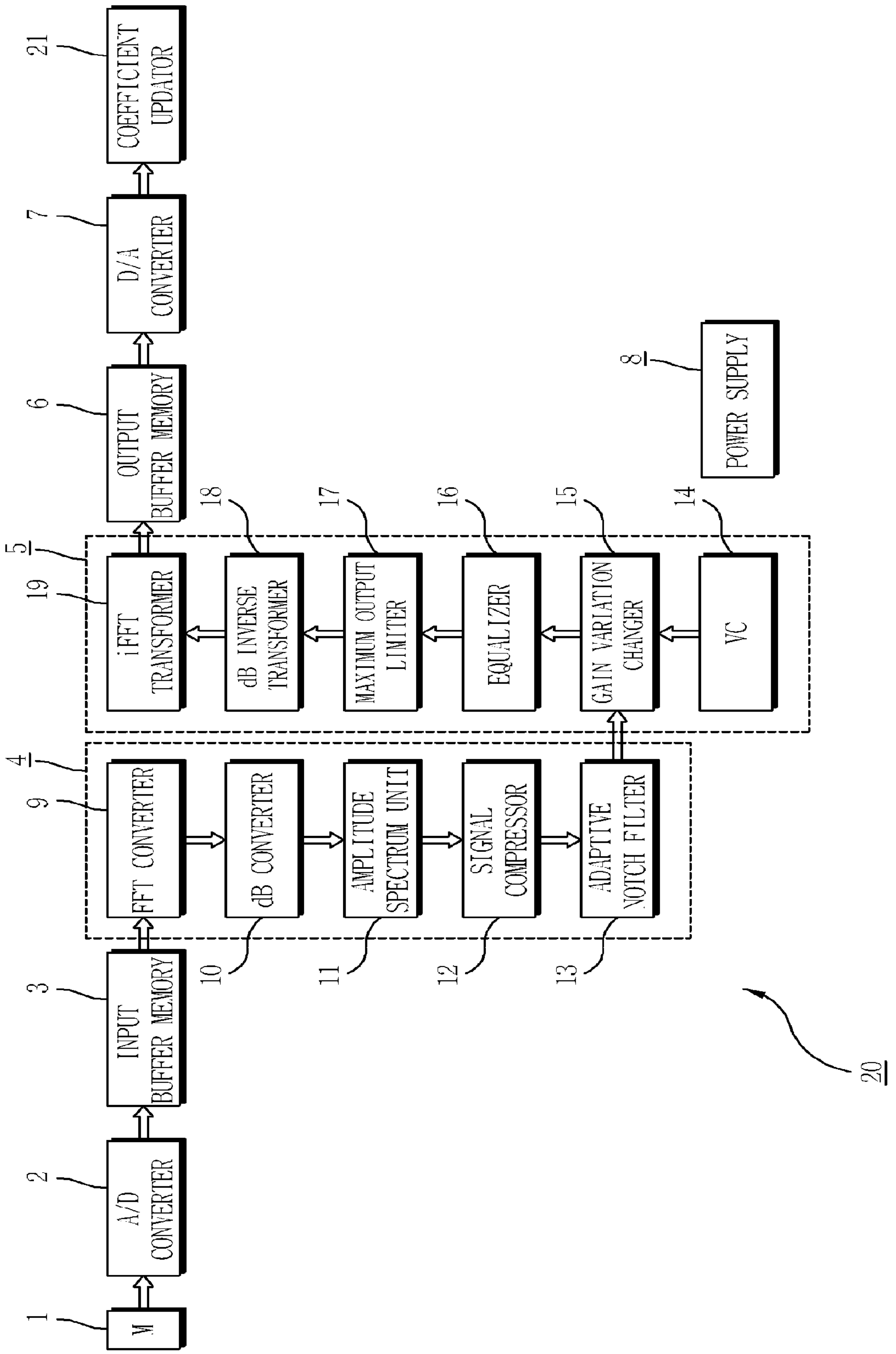
FIG. 3 is a block diagram schematically showing a hearing aid system according to an embodiment of the present invention.

As shown in FIG. 3, a hearing aid system according to a first embodiment of the present invention includes:

an analog-to-digital (A/D) converter 2 that converts an analog input signal tone, that is, speaker's voice signals input from a microphone 1 of the hearing aid system into a digital signal;

an input buffer memory 3 that stores the digital input signal tone data output from the A/D converter 2, to then output the stored digital input signal tone data when the number of the stored digital input signal tone data becomes a set integer N;

a first processor 4 that fast Fourier transforms N input signal tone data output from the input buffer memory 3, and then executes nonlinear compression;

a second processor 5 that inverse fast Fourier transforms amplitude spectrum data that has been non-linear compressed and input from the first processor 4, and then outputs the inverse fast Fourier transformation result;

an output buffer memory 6 that stores the voice signal tone data from which feedback noise has been removed from the second processor 5, until the number of the voice signal tone data is N, to then output the stored voice signal tone data;

a digital-to-analog (D/A) converter 7 that converts the digital voice signal tone data from which feedback noise has been removed and that is output from the output buffer memory 6, into an analog signal, to then output the analog signal to a receiver; and a power supply unit 8 for supplying power to the hearing aid system.

In addition, the first processor 4 includes:

a FFT (fast Fourier transform) unit 9 that fast Fourier transforms N input signal tone data output from the input buffer memory 3, to then transform the N input signal tone data from a time domain to a frequency domain and output the FFT result;

a decibel (dB) converter 10 that calculates only an amplitude component separately from the input signal tone data that has been fast Fourier transformed by the FFT unit 9 and then converts the amplitude component from a linear unit to a dB unit, to then output the dB unit conversion result;

an amplitude spectrum unit 11 that changes a gain variation that independently increases or decreases an amplitude of the dB unit data output from the dB converter 10 by frequency channels, to thus calculate and output N/2 amplitude spectrum;

a signal compressor 12 that executes non-linear compression of the N/2 amplitude spectrum output from the amplitude spectrum unit 11, in accordance with a set stepwise control signal; and an adaptive notch filter 13 that adaptively changes a gain of the non-linear compression signal for each frequency channel output from the signal compressor 12 depending on an input signal level and outputs the adaptively changed gain.

Here, the FFT unit 9 processes the output data as N pieces of complex data.

In addition, the second processor 5 includes:

a gain variation changer 15 that increases or decreases the amplitude spectrum gain output from the adaptive notch filter 13 under the control of a digital volume controller 14 and then outputs the changed gain variations;

an equalizer 16 that equalizes the output signal of the gain variation changer 15 by a frequency domain according to settings of a user and then outputs the equalization result;

a maximum output limiter 17 that differently sets a maximum output limit by a frequency to prevent distortion of the output signal equalized by the equalizer 16, and then output the differently set maximum output limit;

an inverse dB converter 18 that inversely converts the dB unit amplitude spectrum data output from the maximum output limiter 17 into a linear unit; and an inverse fast Fourier transform (iFFT) unit 19 that inversely fast Fourier transforms the amplitude spectrum data that has been inversely converted by the inverse dB converter 18 from a frequency domain to a time domain, and then outputs the iFFT result.

Here, the components of the hearing aid system including the first processor 4 and the second processor 5 according to the present invention can be configured into a DSP IC (digital signal processor integrated circuit) chip.

On the following, a control method for a hearing aid system according to a first embodiment of the present invention will be described below.

Figure 4:
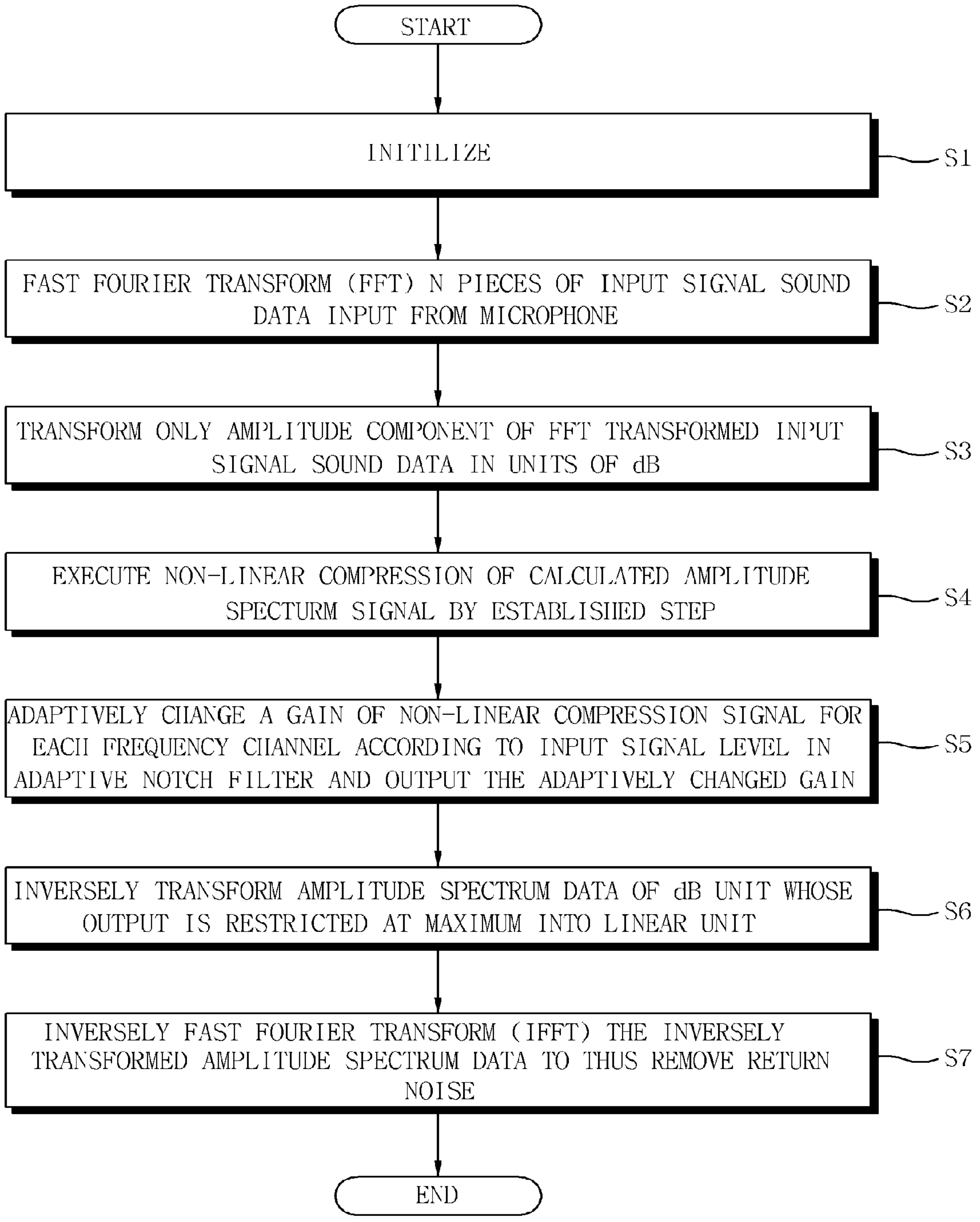
FIG. 4 is a flow chart view of a control method for a hearing aid system according to an embodiment of the present invention.

As shown in FIG. 4, the control method for a hearing aid system according to the present invention includes:

a first process (S2) of fast Fourier transforming N input signal tone data input from a microphone of a hearing aid system at an initial state (S1) from a time domain to a frequency domain in a FFT (fast Fourier transform) unit 9;

a second process (S3) of calculating only an amplitude component separately from the input signal tone data that has been fast Fourier transformed in the first process (S1), and converting the amplitude component from a linear unit to a dB unit in a decibel (dB) converter 10:

a third process (S4) of executing non-linear compression of the amplitude spectrum signal calculated after the second process (S3), by a step set by a signal compressor 12;

a fourth process (S5) of adaptively changing a gain of the non-linear compression signal for each frequency channel after the third process (S4), depending on an input signal level and outputting the adaptively changed gain in an adaptive notch filter 13;

a fifth process (S6) of executing a gain variation change of the amplitude spectrum whose gain has been adaptively changed in the fourth process (S5), and then inversely converting dB unit amplitude spectrum data whose maximum output has been limited into a linear unit in an inverse dB converter 18; and a sixth process (S7) of inversely fast Fourier transforming the inversely converted amplitude spectrum data in an inverse fast Fourier transform (iFFT) unit 19 from a frequency domain to a time domain after the fifth process (S6), and converting the digital voice signal tone data whose feedback noise has been removed into an analog signal, to then output the analog signal.

In addition, the control method further includes a process of changing a gain variation that independently increases or decreases an amplitude of the dB unit data output from the dB converter by frequency channels, in an amplitude spectrum unit 11, to thus calculate and output N/2 amplitude spectrum, before the third process (S4).

In addition, the process of changing the gain variation of the amplitude spectrum is a process of changing the gain variation of the amplitude spectrum under the control of a digital volume controller 14, and then outputting the gain variation change result in a gain variation changer 15.

In addition, the fifth process (S6) further includes a process of equalizing the amplitude spectrum signal whose gain has been varied by a frequency domain according to settings of a user in an equalizer 16 after the process of changing the gain variation of the amplitude spectrum.

In other words, in order to remove a feedback signal by using a hearing aid system of the present invention, an analog-to-digital (A/D) converter 2 of the hearing aid system 20 of the present invention converts an analog input signal tone, that is, speaker's voice signals input from a microphone 1 of the hearing aid system 20 into a digital signal, and outputs the conversion result to an input buffer memory 3. The input buffer memory 3 that stores the digital input signal tone data output from the A/D converter 2, to then output the stored digital input signal tone data to a FFT unit 9, when the number of the stored digital input signal tone data becomes a set integer N. The FFT unit 9 fast Fourier transforms N input signal tone data output from the input buffer memory 3, from a time domain to a frequency domain, and output the FFT result to a decibel (dB) converter 10. In addition, the decibel (dB) converter 10 calculates only an amplitude component separately from the input signal tone data that has been fast Fourier transformed by the FFT unit 9 and then converts the amplitude component from a linear unit to a dB unit, to then output the dB unit conversion result to an amplitude spectrum unit 11. In addition, the amplitude spectrum unit 11 changes a gain variation that independently increases or decreases an amplitude of the dB unit data output from the dB converter 10 by frequency channels, to thus calculate and output N/2 amplitude spectrum to a signal compressor 12.

Here, the signal compressor 12 executes non-linear compression of the N/2 amplitude spectrum output from the amplitude spectrum unit 11, in accordance with a set stepwise control signal, and outputs the non-linear compression of the N/2 amplitude spectrum to an adaptive notch filter 13. Then, the adaptive notch filter 13 adaptively changes a gain of the non-linear compression signal for each frequency channel output from the signal compressor 12 depending on an input signal level and outputs the adaptively changed gain. For example, if the input level of the nonlinear compression signal for each frequency channel is too low, the gain is adaptively changed significantly, to then be output to a gain variation changer 15, while if the input level of the nonlinear compression signal for each frequency channel is too high, the gain is adaptively changed insignificantly, to then be output to a gain variation changer 15.

Meanwhile, the gain variation changer 15 increases or decreases the amplitude spectrum gain output from the adaptive notch filter 13 under the control of a digital volume controller 14 and then outputs the changed gain variations to an equalizer 16. The equalizer 16 equalizes the output signal of the gain variation changer 15 by a frequency domain according to settings of a user and then outputs the equalization result to a maximum output limiter 17.

Thus, the maximum output limiter 17 differently sets a maximum output limit by a frequency to prevent distortion of the output signal equalized by the equalizer 16, and then output the differently set maximum output limit to an inverse dB converter 18. The inverse dB converter 18 inversely converts the dB unit amplitude spectrum data output from the maximum output limiter 17 into a linear unit, and outputs the conversion result to an inverse fast Fourier transform (iFFT) unit 19. Here, the inverse fast Fourier transform (iFFT) unit 19 inversely fast Fourier transforms the amplitude spectrum data that has been inversely converted by the inverse dB converter 18 from a frequency domain to a time domain, and then outputs the iFFT result to an output buffer memory 6. The output buffer memory 6 stores the voice signal tone data from which feedback noise has been removed from the iFFT unit 19, until the number of the voice signal tone data is N, to then output the stored voice signal tone data to a digital-to-analog (D/A) converter 7. The digital-to-analog (D/A) converter 7 converts the digital voice signal tone data from which feedback noise has been removed and that is output from the output buffer memory 6, sequentially into an analog signal, to then output the analog signal to a receiver 21. Thus, a user can hear the analog input signal tone from which external noise has been removed and only speech signal has been amplified through the receiver 21.

Here, only the non-linear amplification process will be described in more detail as follows.

Figure 5:
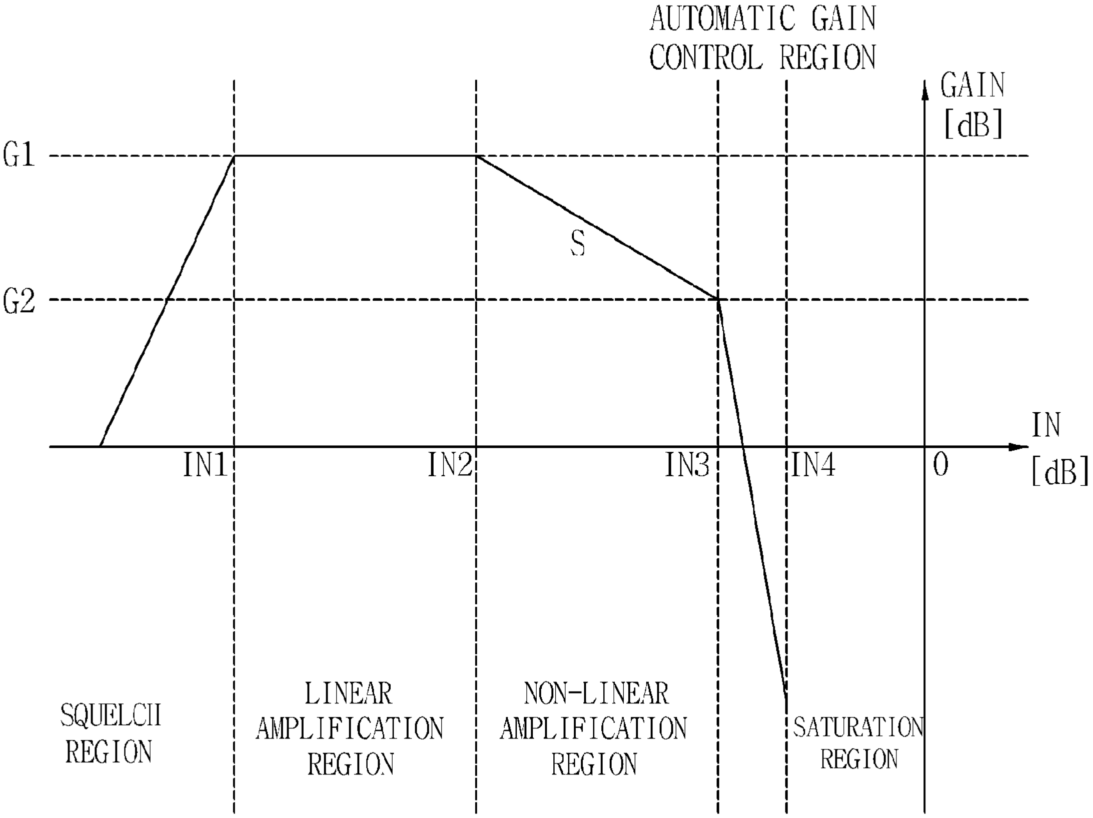
FIG. 5 is a graph schematically showing adaptive nonlinear compression is not executed according to an embodiment of the present invention.

First, it is called compression to vary a signal amplification factor according to the intensity [dB] of an input sound in the field of hearing aids. In addition, as shown in FIG. 5, ranges of the intensities IN1, IN2, IN3, and IN4 of the input sound may be largely divided into five regions. Here, a gain G1 is always constant in a linear amplification region formed between IN1 and IN2, while a gain is inversely proportional to the intensity of the input sound, in a non-linear amplification region formed between IN2 and 1N3 and becomes smaller. For example, when the intensity of the input sound is IN2, the amplification gain is G1 [dB], and when the intensity of the input sound is IN3, the amplification gain is G2 [dB], and becomes smaller. Accordingly, an amplification factor is determined in a nonlinear amplification region formed between IN2 and IN3, according to Equation 1.

$$G = \frac{(G2 - G1)}{(IN3 - IN2)} * (IN - IN2) + G1 \quad \text{[Equation 1]}$$

in which G is an amplification factor, IN is intensity of an input sound, G1 and G2 are an amplification level, respectively, and IN2 and IN3 are intensities of the input sound that define a non-linear amplification region.

In particular, FIG. 5 is a graph illustrating a non-linear compression process of an amplitude spectrum in more detail, in a signal compressor 12 of the hearing aid system of the present invention, in which the unit [dB] of the amplitude spectrum is referred to as IN. Assuming that the frequency interval of the frequency spectrum is 64, and an amplitude value is IN [dB] in one arbitrary channel among 64 frequency channels, the higher the value of IN may be, the intensity of an input sound is closer to a saturation region.

Here, when the IN [dB] is divided into four, the value of the amplitude increases in a sequence of the intensities IN1, IN2, IN3, and IN4 of the input sound in which IN1<IN2<IN3<IN4. Here, a region that is formed before IN1 is called a squelch region, a region that is formed between IN1 and IN2 is called a linear amplification region, a region that is formed between IN2 and IN3 is referred to as a non-linear amplification region, a region that is formed between IN3 and IN4 is called an automatic gain control region, and a region that is formed after IN4 is called a saturation region. Among them, the linear amplification region is an interval at which a constant amplification is performed, but the non-linear amplification region is an interval at which the larger the intensity of the input signal may become, the smaller the amplification factor may be. In the automatic gain control region, an amplification gain is sharply lowered before the intensity of the input signal reaches the saturation region of the receiver, to thus prevent distortion of the output sound. In addition, in the squelch region, as the intensity of the input sound may become smaller, the amplification gain should be lowered in order to avoid the ambient small noise from being amplified.

Meanwhile, the acoustic feedback signal in the hearing aid as described above, is caused because of a high amplification factor in a frequency band in which the acoustic feedback signal or the acoustic return signal can easily occur. Therefore, if the amplification factor is adaptively lowered, the possibility of occurrence of the acoustic feedback signal is relatively reduced.

Figure 6:
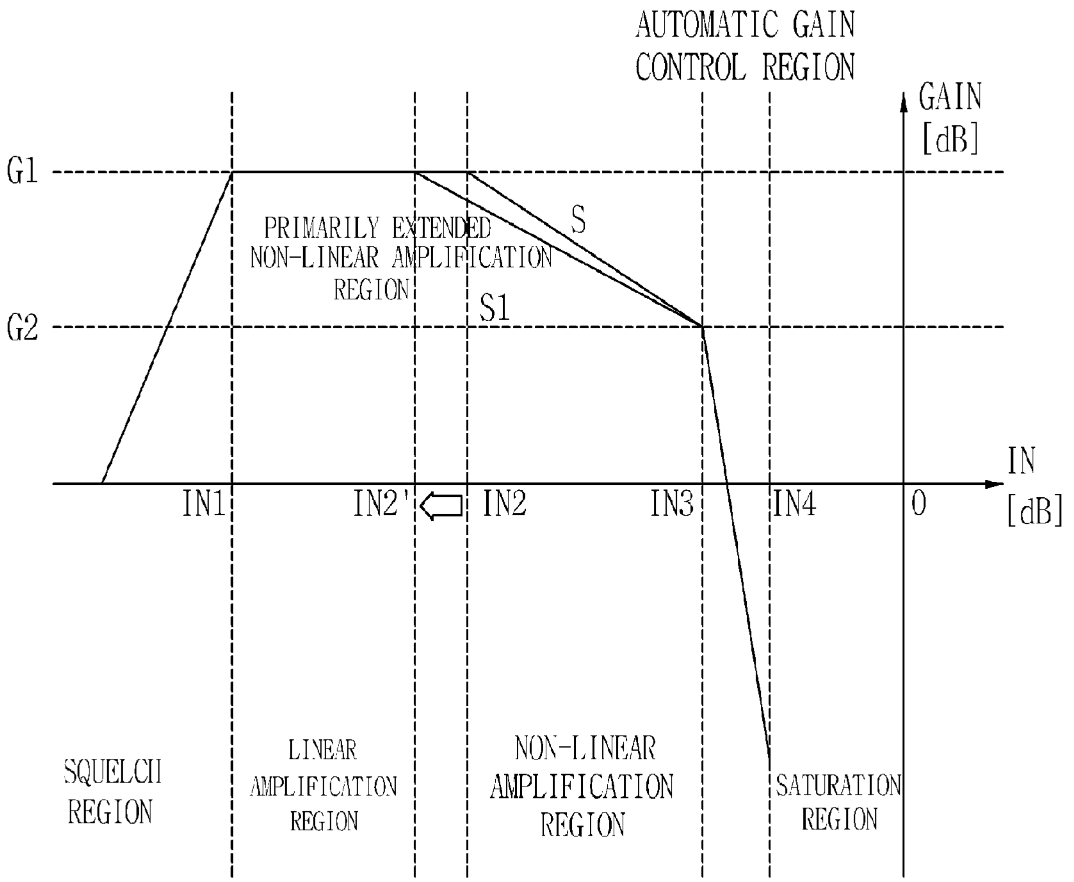
FIG. 6 is a graph schematically showing primary nonlinear compression, according to an embodiment of the present invention.

Here, FIG. 5 illustrates the case that the change of the amplification does not occur adaptively at the time of performing the non-linear compression in the present invention, and FIG. 6 illustrates the case that the change of the amplification occurs adaptively.

Therefore, as shown in FIG. 6, the signal compressor 12 of the hearing aid system 20 according to the present invention, lowers the intensity IN2 of the input sound that is a boundary between the linear amplification region and the non-linear amplification region to become an intensity IN2, for the change of primary adaptive amplification. Then, the linear amplification region is reduced between IN1 and IN2' and the non-linear amplification region is increased between IN2' and IN3, so the non-linear amplification region is expanded. For example, when the intensity of the input sound is IN2', the amplification gain is G1 [dB], and when the intensity of the input sound is IN3, the amplification gain is G2 [dB], and becomes smaller. Accordingly, an amplification factor is determined in a nonlinear amplification region formed between IN2' and IN3, according to Equation 2.

$$G = \frac{(G2 - G1)}{(IN3 - IN2')} * (IN - IN2') + G1 \qquad \text{[Equation 2]}$$

in which G is an amplification factor, IN is intensity of an input sound, G1 and G2 are an amplification level, respectively, and IN2' and IN3 are intensities of the input sound that define a non-linear amplification region.

Figure 7:
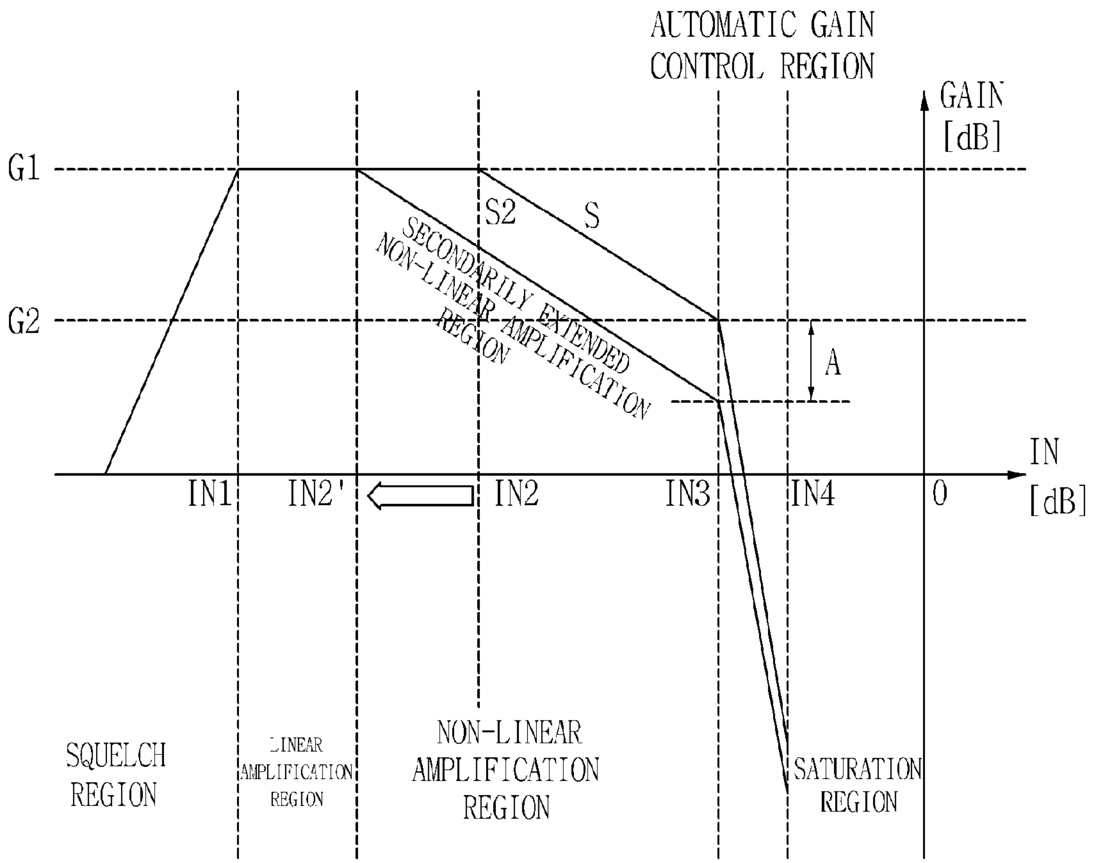
FIG. 7 is a graph schematically showing secondary nonlinear compression, according to an embodiment of the present invention.

In doing so, the amplification factor is gradually lowered from the intensity IN2' of the input sound that is smaller than IN2. The signal compressor 12 of the hearing aid system 20 according to the present invention, executes expansion of a primary non-linear amplification region as shown in FIG. 6, and expansion of a secondary non-linear amplification region as shown in FIG. 7 as necessary, for example, when feedback noise occurs in the frequency band corresponding to any one channel among 64 frequency channels.

The signal compressor 12 is made to shift the set IN2 to IN2' in the primary non-linear amplification region, to thus make the linear amplification region reduced but the non-linear amplification region expanded on the contrary. The amplification gain in the automatic gain control region between IN3 and IN4 should be kept in the same value as before. In this case, in the result of expanding the primary linear amplification region, the amplification gain of the small input sound becomes relatively smaller than that of the large input sound. When the feedback noise is not sufficiently removed with expansion of only the primary linear amplification region, the expansion of the secondary non-linear amplification region as shown in FIG. 7 is executed through the hearing aid system 20 according to the present invention.

Second Embodiment

A signal processing method of a hearing aid in accordance with a second embodiment of the present invention will be described with reference to the accompanying drawings FIGS. 8 to 26.

In a signal processing method according to a second embodiment of the present invention, digital signals that are obtained by converting analog input signals into the digital signals by an analog-to-digital conversion module of a digital IC (Integrated Circuit) chip built in an ear shell 30 of a hearing aid, are indicated as a voice signal strength axis (that is, the Y-axis) of voice signals that are successively input with respect to the time axis (that is, X-axis) by a predetermined time interval (that is, a sampling time). In addition, the analog-to-digital conversion voice signal data is collected by a constant sampling time interval, and is consecutively stored in an internal memory of the digital IC chip. For example, the voice signal data is stored in 1 to 128 memory addresses in units of one byte, in which one byte for each memory is divided into 13 bits, and inputs and outputs a digital binary value of 0 or 1. The 13-bit binary value is converted into a decimal log (dB) scale, and thus has a logarithmic scale range up to 20×log 10 (213), that is, approximately 78 dB. Since a hearing threshold of a hard-of-hearing person requiring a digital hearing aid increases from a normal threshold of about 25 dB, the input and output dynamic range of the digital hearing aid in the hearing threshold of the hard-of-hearing person becomes from 25 dB to 103 dB that is obtained by adding 78 dB to 25 dB. In addition, the digitized and continuously input binary voice signal data are input and output to and from the 128 byte memory spaces, to then perform digital signal processing. In this case, if the sampling frequency is 16 kHz, the sampling time is 0.0625 msec. If 128 pieces of voice data are sequentially entered and stored, voice signals are collected for 8 msec that is obtained by multiplying the sampling time of 0.0625 msec by 128, which is a reciprocal of 8 msec, that is, the length of time corresponding to a cycle of a sinusoidal signal of 125 Hz, and means that minimum number of data that is needed to correct a hearing threshold value of a hard-of-hearing person is 128. The 128 pieces of frequency domain complex data, that is, X(n) are calculated by fast Fourier transforming 128 pieces of time domain real data, that is, x(n). Here, n=1 to 128. The above-described 128 pieces of complex data are odd symmetrical for every 64 pieces of data that are half of the entire data, and thus all the data need not be stored but only 65 pieces of data are stored. In order to inversely fast Fourier transform the 65 pieces of frequency domain complex data that have been calculated by the fast Fourier transformation, back into time domain complex data, the remaining 63 pieces (66 to 128) of odd symmetrical complex data are first calculated from the 65 pieces of complex data just before performing the inverse fast Fourier transformation.

For example, X(66)=X(64)*. For example, assuming X(64)=0.5+j2.4, X(66)=0.5−j2.4. Here, j is the imaginary number symbol. Similarly, X(67)=X(63)*. In this way, odd symmetric complex data is calculated for X(68), . . . , and X(128).

For example, the digital IC chip has physical limitations of computing power of performing digital signal processing operations needed to implement performance of digital hearing aid during the sampling time 0.0625 msec. Therefore, considering the computing power of the digital IC chip, and assuming the computation time required for the implementation of the performance of the digital hearing aid is Ta, for example, if Ta is 2 msec, the digital IC chip should perform all the operations needed to implement the performance of the digital hearing aid for the sampling time of 32 times that are obtained by dividing 2 msec by the sampling time of 0.0625 msec. In this case, some of the voice signal that is constantly and continuously input will be paused for Ta, that is, the digital IC chip operation time. Thus, in order to solve such a pause phenomenon in a fundamental way, the present invention provides a new operation method.

1. A technology provided according to the present invention provides a programming algorithm in the following order, in order to execute operations required to implement the performance of the digital hearing aid for 2 msec with 128 pieces of voice signal time domain data.

A first memory buffer space (input buffer) is a place to primarily collect and store an input voice signal, and a second memory buffer space (pre-processing buffer) is a place to divide the 32 pieces of binary data into four groups and sequentially move and store the former to the latter. A third memory buffer space (post-processing buffer) is a place to temporarily store the results of performing digital signal processing of the 128 pieces of the binary data in the second memory buffer spaces, and a fourth memory buffer space (output buffer) is a place to store the most earliest 32 pieces of binary data from the third memory buffer space, and then wait to output the same to an external receiver.

1-1) The voice signal data that is continuously input in a FIFO (First In First Out) manner is sequentially stored each in sequence of 1, 2, 3, . . . , and 32 at intervals of a sampling time, in the 32 primary memory buffer spaces.

1-2) The digital IC chip parallel executes operations required to implement the performance of the digital hearing aid with the 128 pieces of the binary data 1, 2, . . . , and 128 in the 128 second memory buffer spaces for 2 msec during which the above-described 1-1) process is executed. Then, the final result moves to and is stored in the third memory buffer space. The 128 second and third memory buffer spaces are divided into four groups G1, G2, G3, and G4 of memory buffer spaces in which each group has 32 memory buffer spaces.

1-3) When 32 pieces of the voice signal data are all newly input to the first memory buffer spaces in the above-described 1-1) and 1-2) processes, 32 pieces of data of the group G4 in the third memory buffer spaces are first shifted in parallel to 32 data locations in the fourth memory buffer spaces, within the sampling time of 0.0625 msec, and 96 pieces of data of the groups G1, G2, and G3 in the second memory buffer spaces are shifted to 96 data locations of the groups G2, G3, and G4 in the second memory buffer spaces. The central processing of the digital IC chip executes a memory data shift speed at high speeds superior to the arithmetic operations, and thus a time taken for two times of parallel shift of 32 pieces of memory buffer data and for shift of 96 pieces of memory buffer data is very small, to thus be implemented within the sampling time.

1-4) The fourth memory buffer spaces are memory buffer spaces to output the final results calculated in the digital IC chip simply to the external receiver. The external voice signal is synchronized with the system clock of the digital IC chip and is input to the first memory buffer space according to the sampling time. Simultaneously, the finally processed voice signal is synchronized with the system clock of the digital IC chip and is output from the fourth memory buffer spaces according to the sampling time. As a result, the above-described pause phenomenon is fundamentally solved by using the present invention.

2. Now, as an embodiment of the present invention, a process of parallel executing operations required to implement the performance of the digital hearing aid in the digital IC chip with 128 pieces of input voice signal data 1, 2, . . . , and 128 contained in 128 second memory buffer spaces will be described below.

2-1) The 128 pieces of data in the second buffer memory spaces are shifted to the fifth memory buffer spaces (Fourier time buffers). The 128 pieces of frequency domain complex data, that is, X(n) are calculated by fast Fourier transforming 128 pieces of time domain real data contained in the fifth memory buffer spaces, that is, x(n). Here, n=1 to 128. The calculated 128 pieces of frequency domain complex data are stored in the sixth memory buffer spaces (Fourier frequency buffers). Only the 65 pieces of data from the first to sixth-fifth data among the calculated 128 pieces of frequency domain complex data are shifted from the sixth memory buffer spaces to the seventh memory buffer spaces (linear buffers) and stored in the seventh memory buffer spaces. The seventh memory buffer spaces should store complex data, and thus are composed of a total of 130 memory buffer spaces divided into two groups each containing 65 pieces of data, in which 65 real numbers and 65 imaginary numbers are stored.

2-2) The digital hearing aid undergoes the most appropriate fitting within the dynamic range of the hearing threshold values of a hard-of-hearing person on the basis of hearing tests of the hard-of-hearing person in which a hearing threshold of a log unit (dBHL) is measured as a function of the frequency of a certain unit, to thereby correct a degraded hearing threshold.

Therefore, it is efficient that the digital IC chip handles operations required to implement the performance of the digital hearing aid in a dB unit, from after executing the fast Fourier transformation until before finally executing the inverse fast Fourier transformation. To do this, the amplitude and phase are first calculated from complex data consisting of the real and imaginary numbers in the seventh memory buffer spaces, and thus the real and imaginary numbers are transformed into the amplitude and phase, respectively, so that 65 pieces of the amplitude data and 65 pieces of the phase data are re-stored. If x and y are the real and imaginary numbers, respectively, if the amplitude and phase are x and y, respectively.

2-3) The 65 pieces of the amplitude data in the seventh memory buffer spaces are transformed in units of dB and are re-stored. 20×log 10 (x)

2-4) The 65 pieces of the amplitude data contained in the seventh memory buffer spaces in units of dB are sound pressure signals of voice signals that are sensed by the microphone of the digital hearing aid, and are typically calculated as the value of 0 dB or less. The value of 0 dB or less is transformed in units of an actual sound pressure dBSPL (Sound Pressure Level) by calibrating an absolute sound pressure. In order to calibrate an absolute sound pressure, the calibrated value (in a dBSPL unit) of the absolute sound pressure of the frequency function acquired from measurements of the receiving sensitivity of the microphone is added to the 65 pieces of the amplitude data (in a dB unit) in the seventh memory buffer spaces, by each frequency.

2-5) The 65 pieces of the amplitude data (in a dBSPL unit) in the seventh memory buffer spaces of the 2-4) process, are transformed in units of dBHL. To do this, a loudness curve of the frequency function is used.

2-6) The spectrum modulation algorithm is executed by using the 65 pieces of the amplitude data (in a dBHL unit) in the seventh memory buffer spaces of the 2-5) process, and then the final results are stored as the 65 pieces of the amplitude data (in a dBHL unit) in the eighth memory buffer spaces (log buffers).

2-7) The 65 pieces of the amplitude data (in a dBHL unit) in the eighth memory buffer spaces are transformed in units of dBSPL. To do this, an inverse loudness curve of the frequency function is used.

2-8) The 65 pieces of the amplitude data (in a dBSPL unit) in the eighth memory buffer spaces are transformed in units of dB. To do so, in the similar manner to the above-described 2-4) process, the calibrated value (in a dBSPL unit) of the absolute sound pressure of the frequency function is subtracted from the 65 pieces of the amplitude data (in a dBSPL unit) in the eighth memory buffer spaces, by each frequency.

2-9) The 65 pieces of the amplitude data in the eighth memory buffer spaces that are stored in a dB unit are transformed in a linear unit, and then the 65 pieces of the amplitude data of the linear unit are re-stored, for example, in the same manner as that of the above-described 2-2) process.

2-10) The 65 pieces of the amplitude data (in a linear unit) in the eighth memory buffer spaces and the 65 pieces of the phase data (in a linear unit) in the seventh memory buffer spaces are transformed in units of a complex number by a transformation method, and then the transformation results are shifted and stored in the ninth memory buffer spaces (linear buffers).

$$x+j*y=\text{Amp}\times\cos\text{ (phase)}+j*\text{Amp}\times\sin\text{ (phase)}$$

2-11) The 65 pieces of the complex data in the ninth memory buffer spaces are expanded to 128 pieces of complex data according to the above-described odd symmetry, and the expansion results are shifted and stored in the sixth memory buffer spaces.

2-12) The 65 pieces of the frequency domain complex data in the sixth memory buffer spaces are transformed into 128 pieces of time domain real data by execution of the fast Fourier transformation, and then the transformation results are shifted and stored in the fifth memory buffer spaces.

2-13) The 128 pieces of time domain real data in the fifth memory buffer spaces (the final digital signal processing signals) are shifted and stored in the third memory buffer spaces.

3. On the following, for example, a process of parallel executing the spectrum modulation algorithm of the 2-6) process, will be described. The spectrum modulation algorithm is divided into two to then execute parallel processing.

One is a spectrum amplitude modulation algorithm changing the shape of the amplitude spectrum curve of the voice such as spectrum compression, spectrum squelch, and spectrum equalization, and the other one is a spectrum noise cancellation algorithm that randomly, appropriately, and automatically adjusting a unique amplitude spectrum pattern that occurs when narrow-band noise and acoustic feedback occurs. The frequency spectrum has frequency intervals that are determined as 0 Hz, 125 Hz, 2501 Hz, 375 Hz, 500 Hz, 625 Hz, 750 Hz, 875 Hz, 1000 Hz, 1125 Hz, 1250 Hz, 1375 Hz, 1500 Hz, 16251 Hz, 1750 Hz, 18751 Hz, 2000 Hz, 2125 Hz, 2250 Hz, 2375 Hz, 2500 Hz, 2625 Hz, 2750 Hz, 2875 Hz, 3000 Hz, 3125 Hz, 3250 Hz, 3375 Hz, 3500 Hz, 3625 Hz, 3750 Hz, 3875 Hz, 4000 Hz, 4125 Hz, 4250 Hz, 4375 Hz, 4500 Hz, 4625 Hz, 4750 Hz, 4875 Hz, 5000 Hz, 5125 Hz, 5250 Hz, 5375 Hz, 55001 Hz, 5625 Hz, 5750 Hz, 5875 Hz, 6000 Hz, 6125 Hz, 6250 Hz, 6375 Hz, 6500 Hz, 6625 Hz, 6750 Hz, 6875 Hz, 6000 Hz, 7125 Hz, 7250 Hz, 7375 Hz, 7500 Hz, 76251 Hz, 7750 Hz, 7875 Hz, and 8000 Hz, when the sampling frequency is 16000 Hz, with respect to 65 pieces of the amplitude data (in a dBHL unit) that are stored in the seventh memory buffer spaces according to an embodiment of the present invention.

In order to explain the spectrum amplitude modulation algorithm changing the shape of the amplitude spectrum curve such as spectrum compression, spectrum squelch, and spectrum equalization, the threshold level curves based on the hearing tests should be first known. The threshold level curves are divided into three. While a sinusoidal signal tone of 64 pure tone frequencies except for the frequency of 0 Hz is made to be heard close to the tympanic membrane of the ear via a pressure calibrated earphone, threshold level curves are measured and drawn based on a hearing response of an examinee. A hearing threshold level curve indicates a hearing capability that a sound of a pure tone of an individual frequency is barely audible. In other words, the sound pressure lower than the intensity on the hearing threshold level curve is not heard. A discomfort threshold level curve indicates an acoustic response for the examinee with respect to the sound of the large sound pressure that is heard uncomfortably. The sound pressure larger than the intensity on the discomfort threshold level curve means that the sound pressure is so large as to be unpleasant to be heard.

A stability threshold level curve indicates an acoustic response that a sound of a pure tone of an individual frequency is felt most pleasantly by an examinee. An intensity of the sound that is felt most pleasantly according to the hearing sense of the examinee varies by frequency. The examinee selects the most comfortable threshold level according to his or her own hearing sense preference.

Therefore, the stable threshold level curve is made to determine spectrum equalization that is naturally desired by an examinee. In addition, in order to vary the intensity of the sound of frequencies such as bass and treble that an examinee does not want to hear as being the case, the stable threshold level curve may also vary depending on the choice of the examinee. Thus, a hard-of-hearing person whose hearing is lowered hears external sounds with a hearing loss, but if the external sounds are amplified by frequency according to the stable threshold level curve of the hard-of-hearing person, he or she feels the sound most comfortably. All the three threshold level curves are measured in a dBHL unit, and thus 65 pieces of amplitude data are stored in the seventh memory buffers in units of dBHL. A difference between the discomfort threshold level curve and the hearing threshold level curve is called a hearing dynamic range, and the hearing dynamic range will vary depending on the frequency as a function of frequency. The hearing dynamic range is determined in the range of physical limitations in the lowest and highest values that may be heard by a hearing of a hard-of-hearing person. The 65 pieces of amplitude data stored in the seventh memory buffers (in units of dBHL) are data that intensities of external voice signals are sensed and stored by each frequency with a voice amplitude spectrum representing intensities of the sound pressures of the external voice signals. According to the external voice amplitude spectrum, the intensity of each frequency forms a curve of a different pattern every second, among the hearing threshold level curve, the stable threshold level curve, and the discomfort threshold level curve of the hard-of-hearing person.

In addition, even a sound of a small intensity below the hearing threshold level curve is also considered. In the case of a conversational sound, a syllable is composed of phonemes, and syllables are added to form a word. Here, the syllable is divided into an initial sound, an intermediate sound, and a final consonant. Here, the vowel generally has the larger acoustic energy than that of the consonant, and the frequency of the vowel is close to the bass, but the consonant has the smaller acoustic energy than that of the vowel and the frequency of the vowel is close to the treble. In particular, most of the hard-of-hearing persons miss the consonant of the initial sound. This is because the acoustic energy of the consonant of the initial sound is small.

Thus, the digital hearing aid must be able to detect at least the consonant of the initial sound of the conversational sound, and amplify the voice amplitude of the corresponding frequency by the hearing threshold level curve, so that the hard-of-hearing persons can hear the consonant of the initial sound. However, if even the ambient small noise is also amplified together with the conversational sound, the speech discrimination of the conversational sound that must be heard becomes difficult due to the ambient noise. Thus, the difference between the ambient small noise and the conversational sound must be distinguished. If a spectrum of voice signals that are continuously input for 200 msec is smaller than a proper threshold (on a consonant threshold level curve in units of dBHL) corresponding to acoustic energy of the consonant of the initial sound of the conversational sound, the present invention is configured to consider that the signals are the ambient small noise, and to execute attenuation rather than amplification. This is called a spectrum squelch automatic control. That is, if the ambient noise acoustic signal of the intensity smaller than the consonant of the initial sound in the conversational sound is input via the microphone of the digital hearing aid, watching is performed for 200 msec, and then if a sound of the small intensity is still input during even the time of the 200 msec, the present invention is configured to consider that the signals are the ambient environmental noise, and to execute attenuation rather than amplification of the digital hearing aid. To do this, a timer is needed to observe spectrum squelch at intervals of time of 200 msec. The reason why the observation time is 200 msec is because a time of a syllable of the conversational sound is 200 msec at maximum. The digital IC chip of the digital hearing aid executes amplification of the input voice of the smaller intensity than the hearing threshold level curve at a normal time, but executes attenuation instead of amplification immediately once the input voice of the smaller intensity than the hearing threshold level curve continues to be input for more than 200 msec. Therefore, the hard-of-hearing person is prevented from being continuously exposed to the amplified ambient noise, and the hard-of-hearing person who wears the digital hearing aid is oriented to focus on only the conversational sound.

Therefore, if it is determined that the input sound is a normal conversational sound, the amplitude level for each frequency is automatically adjusted so that the center value of the external voice amplitude spectrum is close to the stable threshold level curve within the hearing dynamic range between the hearing threshold level curve and the discomfort threshold level curve of the hard-of-hearing person. As a result, the hard-of-hearing person can hear the voice most comfortably with his or her hearing. To this end, the voice amplitude spectrum must be randomly amplified at a certain frequency, or must be arbitrarily attenuated at another frequency.

A difference between energy levels between the consonant of the initial sound and the vowel of the intermediate sound in the general dialog sound is 45 dB to 50 dB in the case of the dialog sound. However, the hearing dynamic range between the hearing threshold level curve and the discomfort threshold level curve of the hard-of-hearing person varies depending on frequencies. The hearing dynamic range becomes very narrow as the hardness of the hard-of-hearing becomes severer from the slight hard-of-hearing, to the middle hard-of-hearing, the high hard-of-hearing, or the deep hard-of-hearing. For example, the hearing dynamic range of the high hard-of-hearing person used to be reduced to 30 dB. Thus, the voice amplitude spectrum depending on the frequency should be appropriately changed so that the dynamic range of the conversational sound is covered within the hearing dynamic range of the hard-of-hearing person, which is called spectrum compression.

In addition, the spectrum compression makes up an algorithm, so that an amplification factor is varied at a constant rate differently depending on the frequency according to the measured hearing dynamic range of the hard-of-hearing person, after the dynamic range of the conversational sound is determined in advance. Assuming that the dynamic range of the conversational sound is determined as 25 dBHL to 70 dBHL at a certain frequency, and the hearing dynamic range of the hard-of-hearing person is determined as 60 dBHL to 90 dBHL at the same frequency, as an embodiment, a rate is calculated, and thus assuming that the amplitude of the input voice spectrum at a certain frequency x is 50 dBHL (x=50 dBHL) for example, the amplitude y to be output is 76.6667 dB (y=766667 dB) by the formula, and since the original input amplitude is 50 dBHL, the amplification factor is determined as y−x (=16,6667 dB).

Here, when the spectrum of the common conversational sound is fast Fourier transformed to analyze frequency characteristics, the vowel threshold level of the conversational sound is high as 75 dBHL or so in the low-pitched tone of the conversational sound, and is lowered as 70 dBHL in the high-pitched tone of the conversational sound. On the contrary, the consonant threshold level of the conversational sound is high as 35 dBHL or so in the low-pitched tone of the conversational sound, and is lowered as 25 dBHL in the high-pitched tone of the conversational sound. This indicates that the dynamic range of the conversational sound is about 40 dB in the low-pitched tone and about 45 dB in the high-pitched tone. The normal hearing person has the hearing threshold level lower than the consonant threshold level of the conversational sound so as to hear all of the conversational sounds, but the hard-of-hearing person has the hearing threshold level higher than the consonant threshold level of the conversational sound. Accordingly, the consonant threshold level of the conversational sound should be raised by the hearing threshold level at minimum for the hard-of-hearing person. To do so, it is inevitable to amplify the voice amplitude spectrum of the digital hearing aid. Meanwhile, the vowel threshold level of the conversational sound may be higher than the hearing threshold level to the light-middle hard-of-hearing person and may be lower than the hearing threshold level to the medium-high hard-of-hearing person. Thus, the input voice should be amplified or attenuated differently for each frequency so that the dynamic range of the conversational sound is covered within the hearing dynamic range of the hard-of-hearing person.

Meanwhile, the second embodiment of this invention provides a new algorithm that the dynamic range of the conversational sound between the consonant threshold level and the vowel threshold level of the typical conversational sound matches the hearing dynamic range between the hearing threshold level and the discomfort threshold level of the hard-of-hearing person. This is discerned as the dynamic range compression algorithm of the spectrum amplitude modulation algorithm. The proposal of the second embodiment of the present invention is provided to amplify the consonant threshold level of the typical conversational sound by the result of adding 5 dB (=A) to the hearing threshold level. Accordingly, the consonant of the initial sound in the conversational sound that is missed most easily by the hard-of-hearing person can be heard clearly. In this case, it is proposed that the vowel threshold level of the typical conversational sound be amplified by the result of adding 10 dB (=B) to a stable (desirable) threshold level. As a result, the hard-of-hearing person can wear the digital hearing aid comfortably by amplifying the vowel to a degree lest the hard-of-hearing person feels discomforts. It is not difficult to provide the above-described proposal for the light-middle hard-of-hearing person, but a gap between the stable (desirable) threshold level and the discomfort threshold level is narrowed as 10 dB (=B) or smaller for the medium-high hard-of-hearing person, in which case it is proposed that the vowel threshold level of the normal conversational sound should be amplified by the discomfort threshold level. The change of the amplification is applied differently for each individual frequency.

4. The spectrum amplitude modulation algorithm that changes the shape of the amplitude spectrum curve such as the aforementioned spectrum compression, spectrum squelch, and spectrum equalization, is a programming method of making the dynamic range of the typical conversational sound of the 64 voice amplitude spectrums in the seventh memory buffer spaces close to the hearing dynamic range between the hearing threshold level and the discomfort threshold level that are measured from the hard-of-hearing person by each frequency.

Meanwhile, the dynamic range compression algorithm can be carried out as follows.

4-1) In other words, the discomfort threshold level measured by the hearing test from the hard-of-hearing person is stored in the tenth memory buffer spaces (the discomfort threshold buffers) having the 65 addresses from the second to sixty-fifth addresses corresponding to the frequencies of 125 Hz to 8000 Hz (a value of zero (0) is stored in the first address). Likewise, the stable (desirable) threshold level measured by the hearing test is stored in the eleventh memory buffer spaces (the desirable threshold buffers) having the 65 addresses from the second to sixty-fifth addresses (a value of zero (0) is stored in the first address). Likewise, the measured hearing threshold level is stored in the twelfth memory buffer spaces (the hearing threshold buffers) having the 65 addresses from the second to sixty-fifth addresses (a value of zero (0) is stored in the first address).

4-2) The vowel threshold level of the typical conversational sound is stored in the thirteenth memory buffer spaces (the vowel threshold buffers) having the 65 addresses from the second to sixty-fifth addresses corresponding to the frequencies of 125 Hz to 8000 Hz (a value of zero (0) is stored in the first address). Likewise, the consonant threshold level of the typical conversational sound is stored in the fourteenth memory buffer spaces (the consonant threshold buffers) having the 65 addresses from the second to sixty-fifth addresses (a value of zero (0) is stored in the first address). Likewise, the binary value of zero (0) is stored in the fifteenth memory buffer spaces (the squelch threshold buffers) having the 65 addresses from the second to sixty-fifth addresses (corresponding to the frequencies of 125 Hz to 8000 Hz (a value of zero (0) is stored in the first address).

4-3) If the voice signal amplitude spectrum data that is shifted into the seventh memory buffer spaces, at intervals of 2 msec, is immediately shifted to the eighth memory buffer spaces for each frequency, the amplitude modulation spectrum is not performed at all. For the spectrum amplitude modulation, 65 pieces of binary data contained in the seventh memory buffer spaces are shifted and copied as they are onto the eighth memory buffer spaces (log buffers) having the 65 binary addresses. If the voice amplitude spectrum appearing in the eighth memory buffer spaces is greater than the discomfort threshold level stored in the tenth memory buffer spaces, the voice amplitude spectrum is immediately corrected into the discomfort threshold level. This is to automatically limit the maximum output that is unpleasant to be heard by the hard-of-hearing person.

4-4) Since it should be continuously observed at a time interval of 200 msec for the above-mentioned spectrum squelch function, the timer that is hardwired in the digital IC chip or that works by programming time should be automatically set and activated at the time of initializing the digital IC chip. The 65 pieces of binary data of the seventh memory buffer spaces are stored as an average value in the fifteenth memory buffer spaces. In other words, the pre-stored data (first to sixty-fifth data) by frequency of the fifteenth memory buffer spaces are added to new data (first to sixty-fifth data) that is newly input from the seventh memory buffer spaces, and then the added result is divided by two (2) to then obtain an average value. Then, the average value is re-stored as the first to sixty-fifth data in the fifteenth memory buffer spaces by frequency. Accordingly, the fifteenth memory buffer spaces are utilized to observe the average amplitude spectrum level of the external voice signal. Every time when the timer provides an interrupt signal every observation time of 200 msec by means of an interrupt method, the intensity of the amplitude spectrum in the fifteenth memory buffer spaces are compared with, and added to that of the fourteenth memory buffer spaces by frequency. Accordingly, if the added result is less than the appropriate threshold, it is judged that no voice signal is externally input (that is, the squelch situation occurs), and then the contents of the eighth memory buffer spaces are set as a value of 1 dBHL. Then, the fifteenth memory buffer spaces are re-initialized as a value of zero (0) of the binary data and then the spectrum amplitude modulation (dynamic range compression) algorithm is terminated.

4-5) When no squelch situation happens, the process continues to move on to the next step. As described above, the present invention has proposed the dynamic range compression algorithm that matches the dynamic range of the conversational sound between the consonant threshold level (the fourteenth memory buffers) and the vowel threshold level (the thirteenth memory buffers) of the typical conversational sound to the hearing dynamic range between the hearing threshold level (the twelfth memory buffers) and the discomfort threshold level (the tenth memory buffers) of the hard-of-hearing person, and proposed that the consonant threshold level (the fourteenth memory buffers) of the typical conversational sound should be amplified into an addition result of adding 5 dB (=A) to the hearing threshold level (the twelfth memory buffers), and the vowel threshold level (the thirteenth memory buffers) of the typical conversational sound should be amplified into an addition result of adding 10 dB (=B) to the stable (desirable) threshold level (the eleventh memory buffers), or into the value below the discomfort threshold level (the tenth memory buffers) of the hard-of-hearing person. This dynamic range of the conversational sound is separately calculated for each of the frequencies of the two to sixty-five memory addresses.

As an embodiment of the present invention, assuming that for one frequency, the consonant threshold level of the conversational sound is 'a', the vowel threshold level of the conversational sound is 'b', the discomfort threshold level is 'c', the stable (desirable) threshold level is 'd', and the hearing threshold level is 'e', the amplification factor is determined by 'y' as illustrated in Equation 3.

$$y = \frac{f - (e + A)}{(b - a)} * (x - a) + e + A \quad \text{[Equation 3]}$$

Here, f is a value of d+B or c, which is preferably a value equal to or smaller than c. As an embodiment, it has been proposed that A should be 5 dB, and B should be 10 dB, but since a custom digital hearing aid is customized depending on customers or patients, values of A and B can be adjusted depending of the hearing senses of the customers or patients. In addition, x is the voice amplitude spectrum stored in the seventh memory buffer spaces and y is the voice amplitude spectrum stored in the eighth memory buffer spaces. In this manner, the dynamic range compression algorithm is executed for each frequency. The spectrum noise cancellation algorithm that randomly, appropriately, and automatically adjusts a specific amplitude spectrum shape that appears when the above-mentioned narrowband noise or acoustic feedback occurs, will be described below. The voice signal amplitude data (first to sixty-fifth data) that are newly input to the seventh memory buffer spaces is the instantaneous voice signal amplitude spectrum that is input at the interval of 2 msec. The change of the instantaneous voice signal amplitude spectrum appears significantly. However, if the change of the instantaneous voice signal amplitude spectrum is averaged over time, the spectrum flattens over time and appears stable. Then, when the acoustic feedback (howling) or narrow-band noise occurs, the amplitude in the frequency band that corresponds to the specific acoustic feedback (howling) or narrow-band noise from the average value that is subsequently calculated according to time suddenly increases. These rapid changes mainly occur in high-frequency band, in which these acoustic feedback or narrow-band noise is an uncomfortable sound that is unpleasant to the normal hearing person as well as the hard-of-hearing person.

Therefore, if such a drastic change in the amplitude spectrum is observed to occur in the narrow-band, it is considered as a kind of noise and the amplitude of the corresponding frequency band should be lowered. Thus, if the feedback automatic cancellation function or narrow-band noise automatic removal function is added in the digital hearing aids, wearers of wearing the digital hearing aids can use the digital hearing aids much easier.

5. Now, a process of implementing the above-mentioned spectrum noise cancellation algorithm will be described below.

5-1) The voice signal amplitude spectrum data (first to sixty-fifth data) that is sequentially input and newly stored into the seventh memory buffer spaces, at intervals of 2 msec, is stored in the fifteenth memory buffer spaces (squelch buffers) having the sixty-five addresses, and simultaneously is averaged and stored in the sixteenth memory buffer spaces (feedback buffers) having the sixty-five addresses, in a parallel processing manner. The sixteenth memory buffer spaces were initialized with values of zeros (0s) at the same time like the fifteenth memory buffer spaces. The amplitude data (first to sixty-fifth data) that is pre-stored by frequency in the sixteenth memory buffer spaces is added to the new amplitude data (first to sixty-fifth data) that is newly input from the seventh memory buffer spaces, and then the added result is divided by two (2) to then obtain an average value. Then, the average value is re-stored as the first to sixty-fifth data in the sixteenth memory buffer spaces by frequency.

Accordingly, the sixteenth memory buffer spaces are utilized to observe the average amplitude spectrum level of the external voice signal.

Unlike the squelch control, the feedback control does not need any timer. The reason is because the amplitude of the frequency band should be immediately lowered, every time the narrow-band noise and acoustic feedback occurs. Thus, if the size of the amplitude at a particular frequency among the spectrum amplitude stored in the sixteenth memory buffer spaces appears larger than the initial set threshold, that is, the acoustic feedback or narrow-band noise occurs, the value of the amplitude spectrum of the corresponding frequency is immediately lowered into the stable (desirable) threshold level (the eleventh memory buffers).

Figure 8:
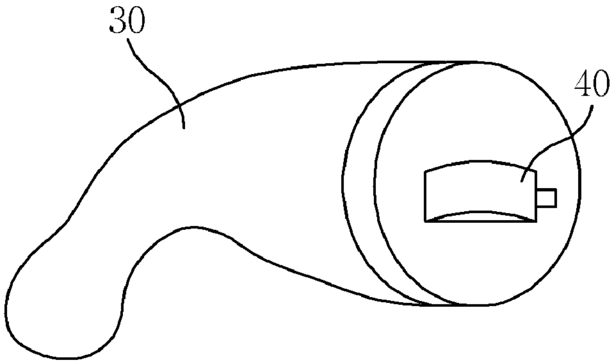
FIG. 8 is a perspective view schematically showing an ITE (In-The-Ear) type digital hearing aid to which a method according to a second embodiment of the present invention is applied.
Figure 9:
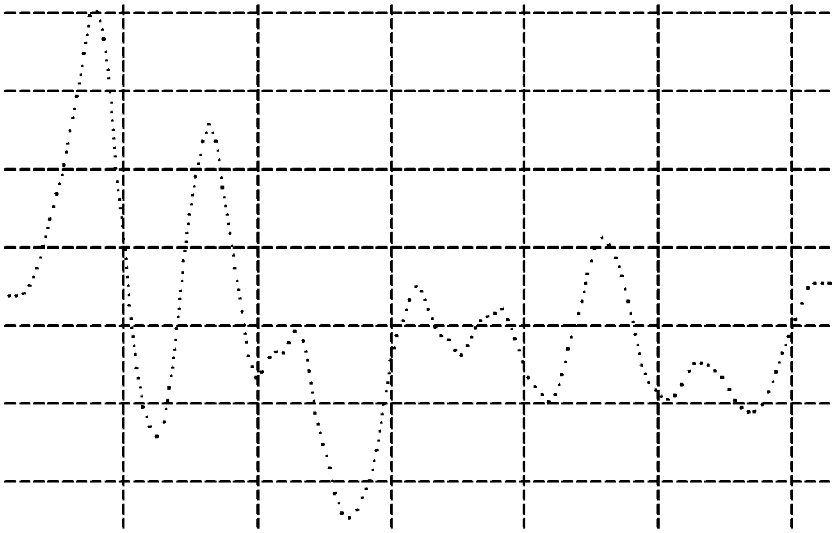
FIG. 9 is a conceptual view showing a digital signal that is converted by an analog-to-digital converter in a digital IC chip according to a second embodiment of this invention.
Figure 10:
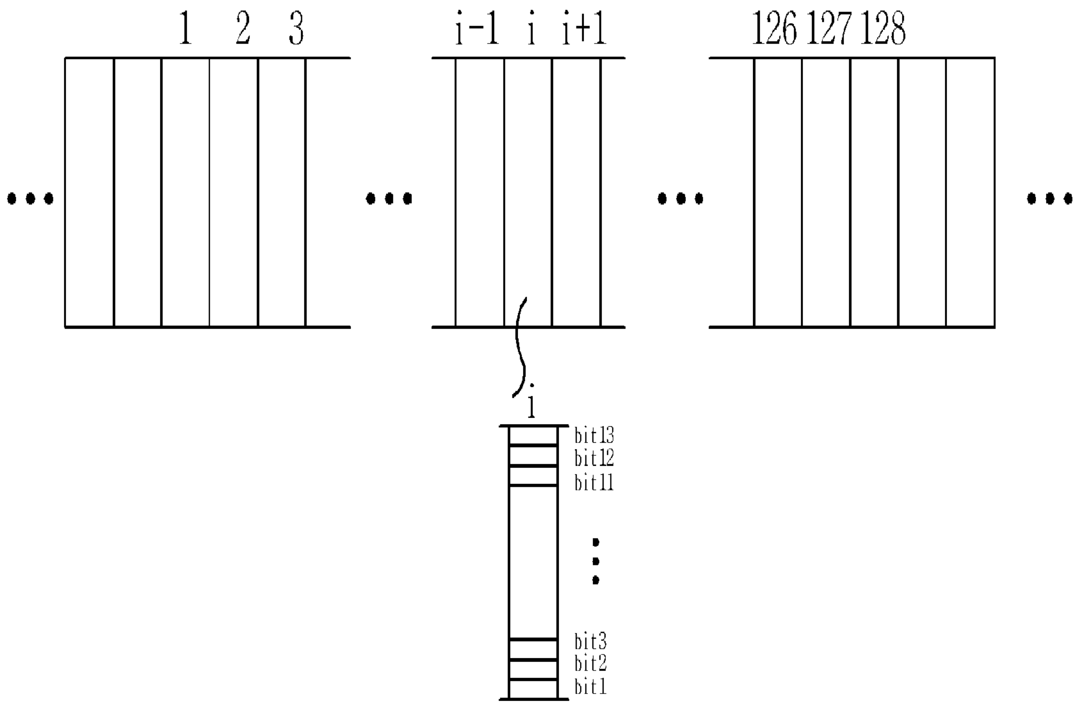
FIG. 10 is a conceptual view showing a set of memory buffer spaces (1-128 addresses) with 13 bits per byte according to a second embodiment of this invention.
Figure 11:
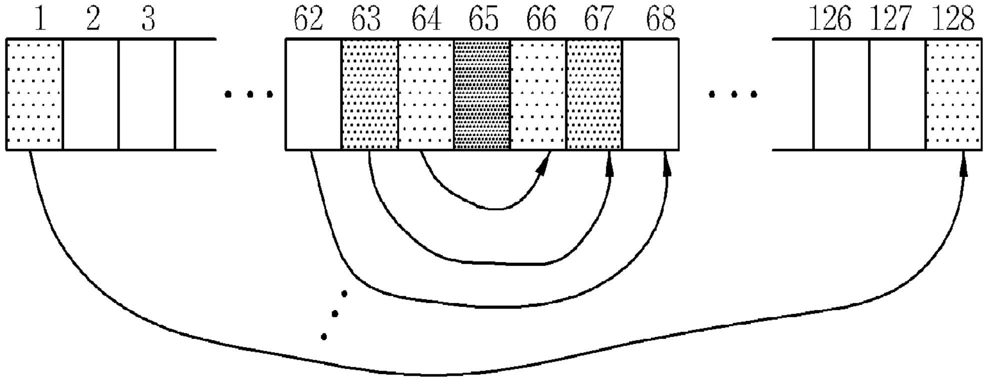
FIG. 11 is a conceptual view showing an operation to compute 128 pieces of odd symmetrical complex data from 65 pieces of complex data according to a second embodiment of this invention.
Figure 12:
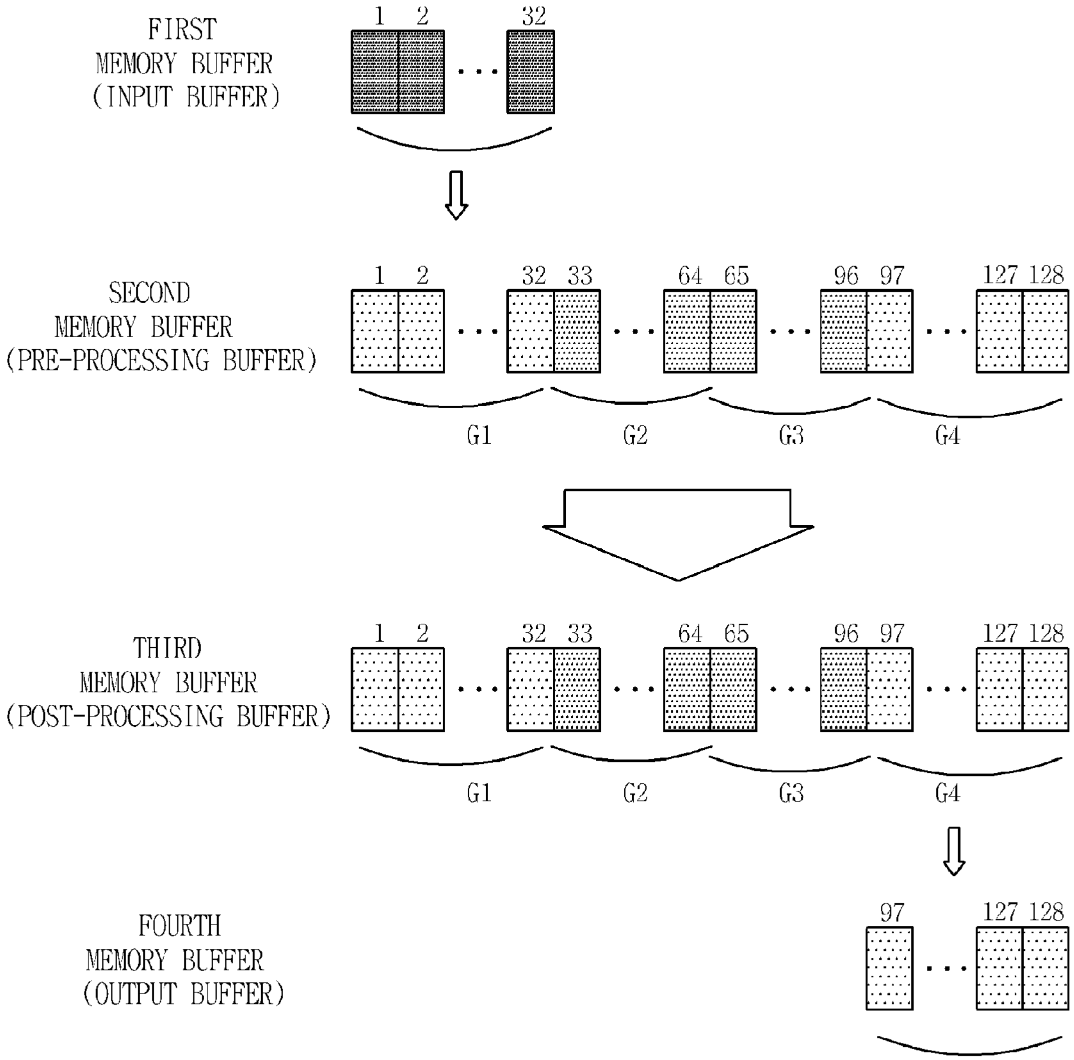
FIG. 12 is a conceptual view showing a flow of data for processing a digital signal in first to fourth memory buffer spaces according to a second embodiment of this invention.
Figure 13:
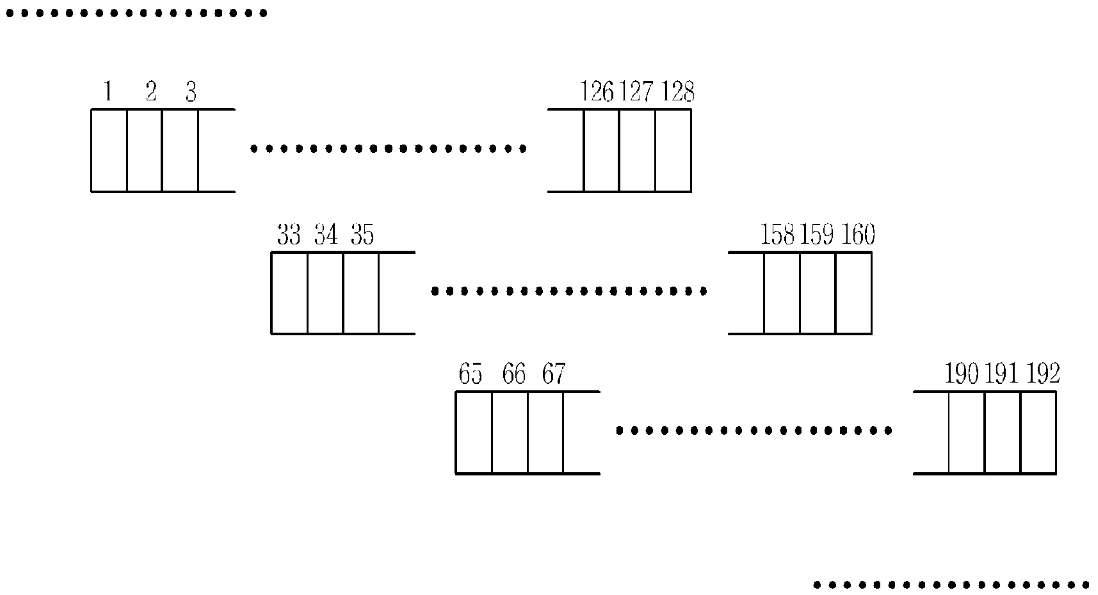
FIG. 13 is a conceptual view showing an operation of shifting 32 pieces of new data while continuously processing digital signals with 128 memory buffers according to a second embodiment of this invention.
Figure 14:
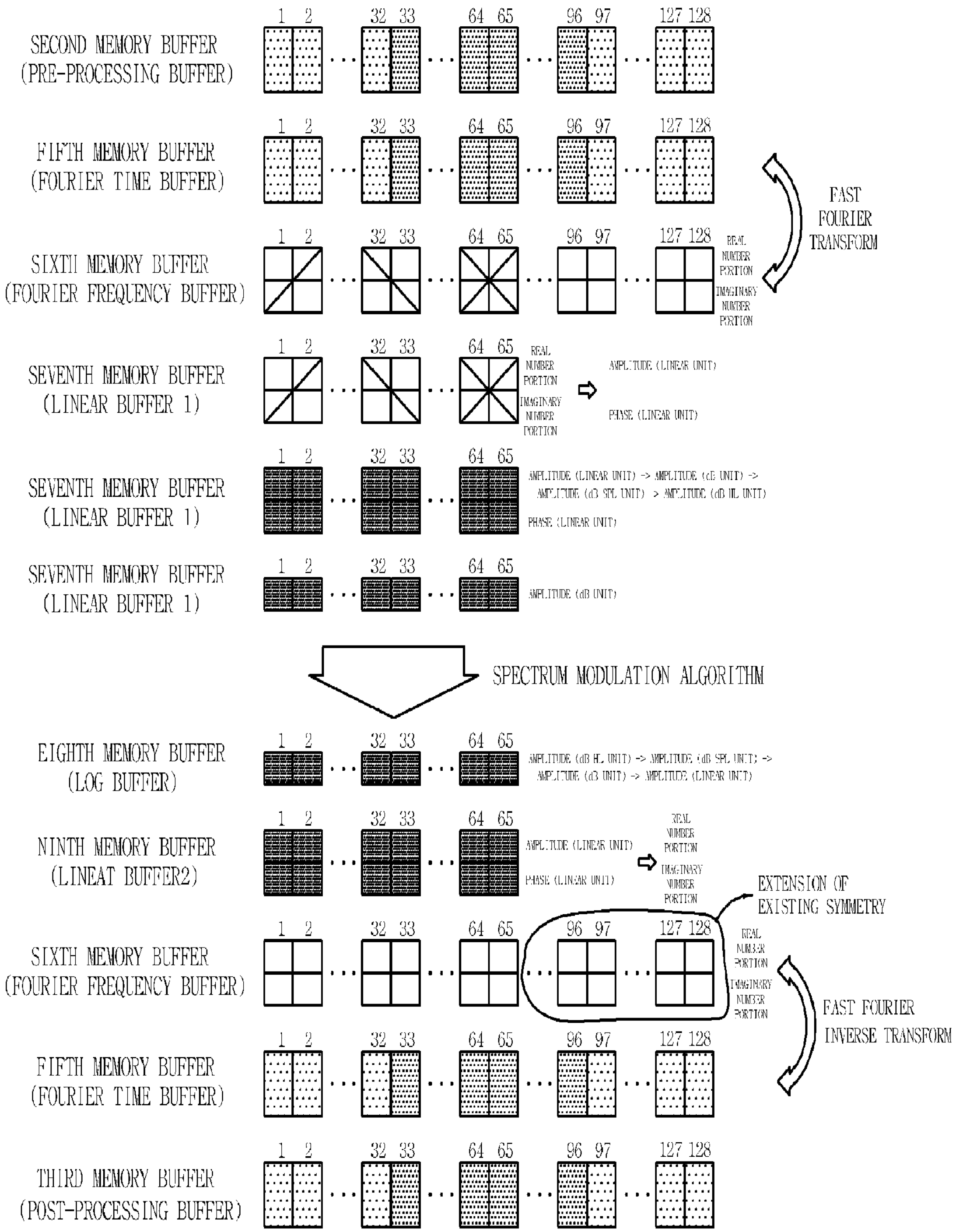
FIG. 14 is a conceptual view showing an operation of executing a spectrum modulation algorithm and an inverse fast Fourier transform after executing a fast Fourier transform according to a second embodiment of this invention.
Figure 15:
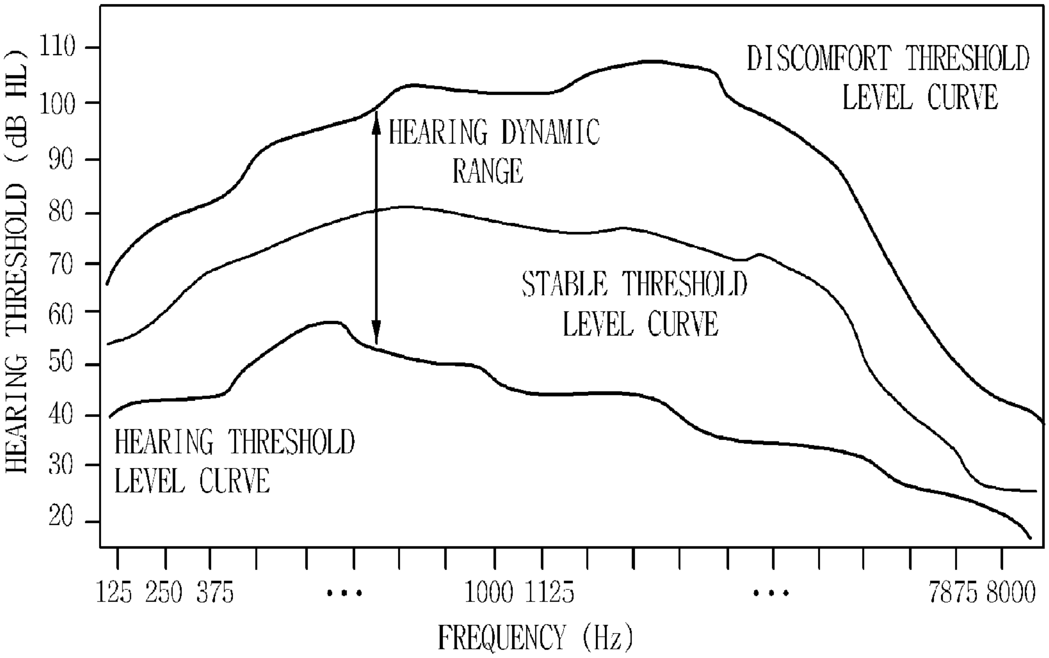
FIG. 15 is a graph conceptually showing hearing test results of a hard-of-hearing person according to a second embodiment of this invention.
Figure 16:
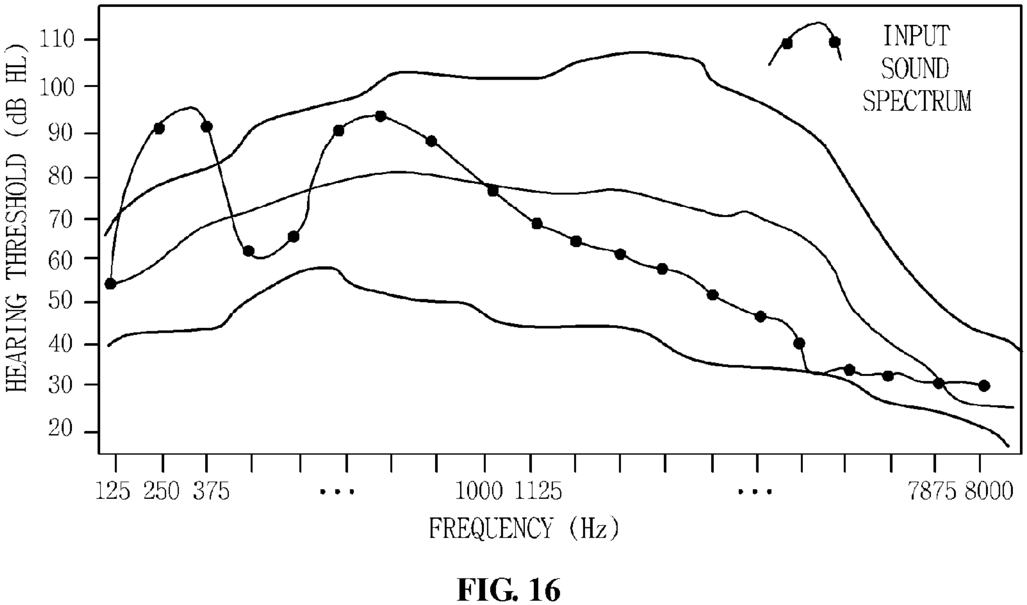
FIG. 16 is a graph conceptually showing both of threshold value level curves and voice signal spectrum by a hearing test according to a second embodiment of this invention.
Figure 17:
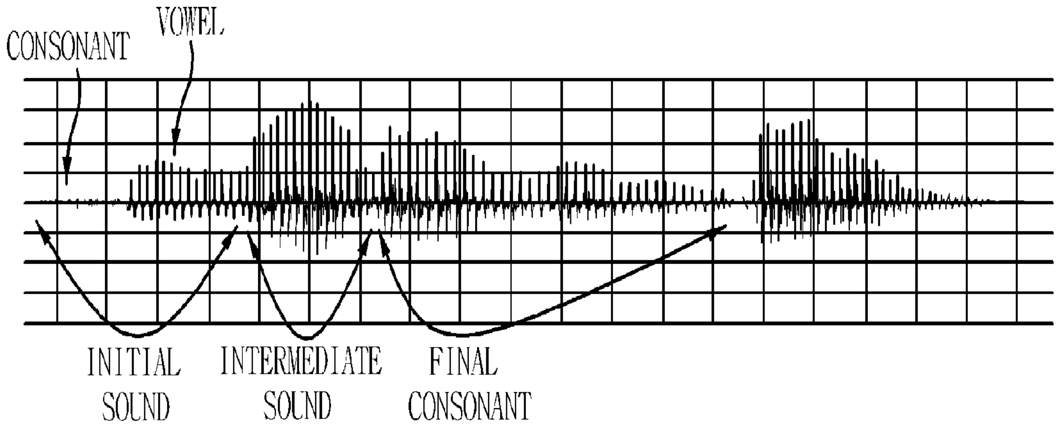
FIG. 17 is a graph conceptually showing an initial sound, an intermediate sound, and a final consonant in the waveform of a voice signal according to a second embodiment of this invention.
Figure 18:
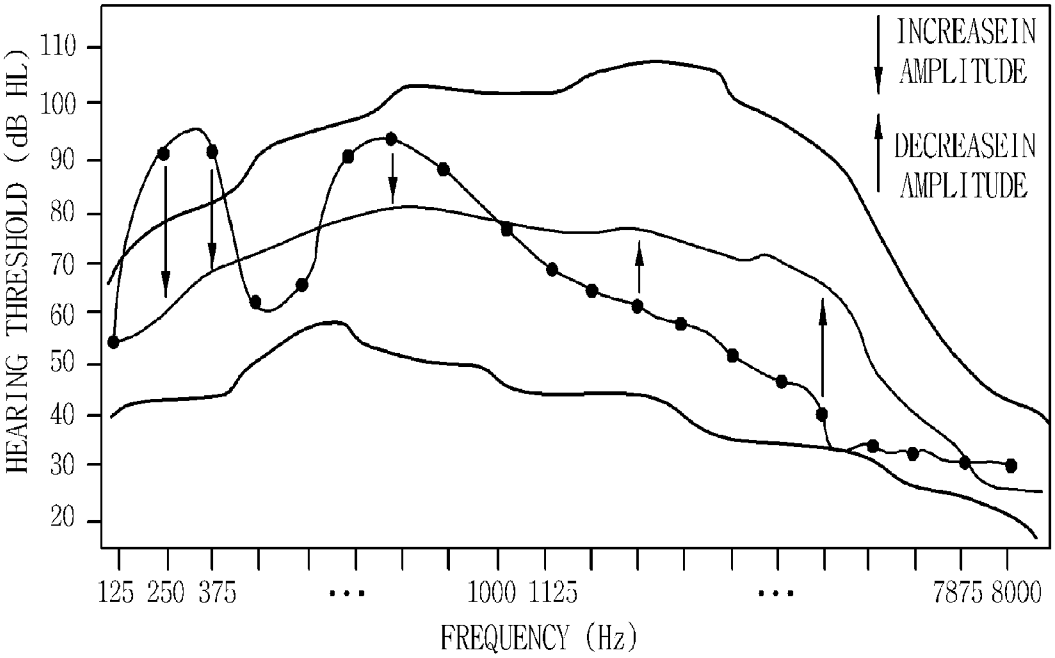
FIG. 18 is a graph conceptually showing how a voice signal is amplified or attenuated in a frequency band according to a hearing by a hard-of-hearing person according to a second embodiment of this invention.
Figure 19:
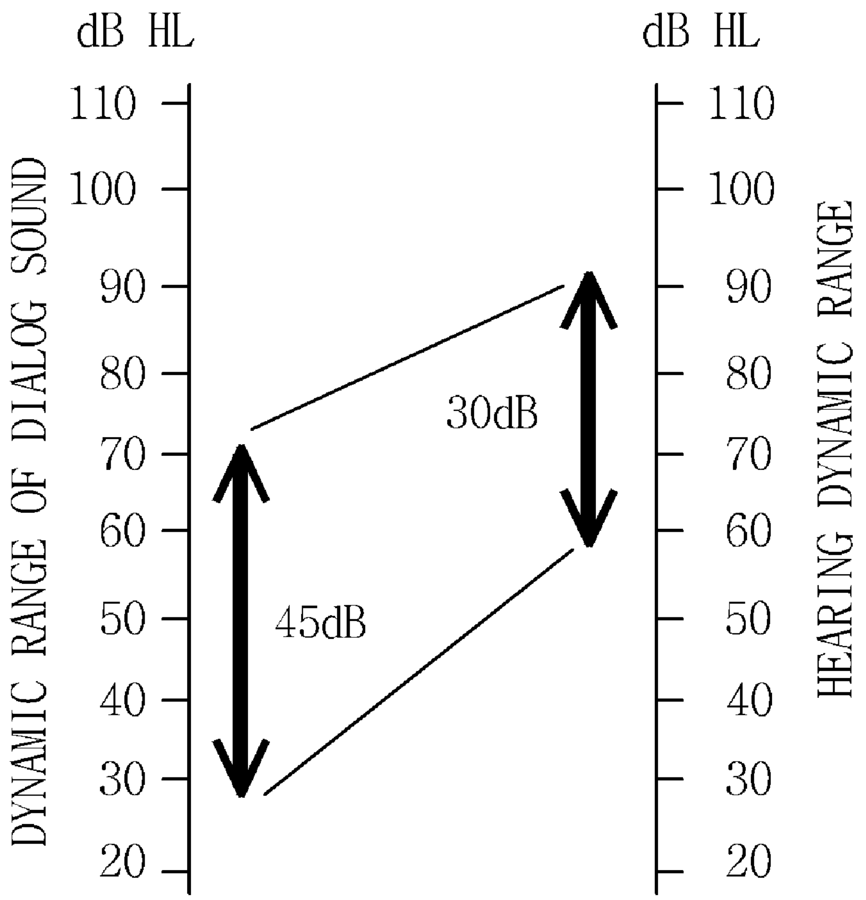
FIG. 19 is a graph conceptually showing how a dynamic range of a conversation sound matches a dynamic range of a lowered hearing of a hard-of-hearing person according to a second embodiment of this invention.
Figure 20:
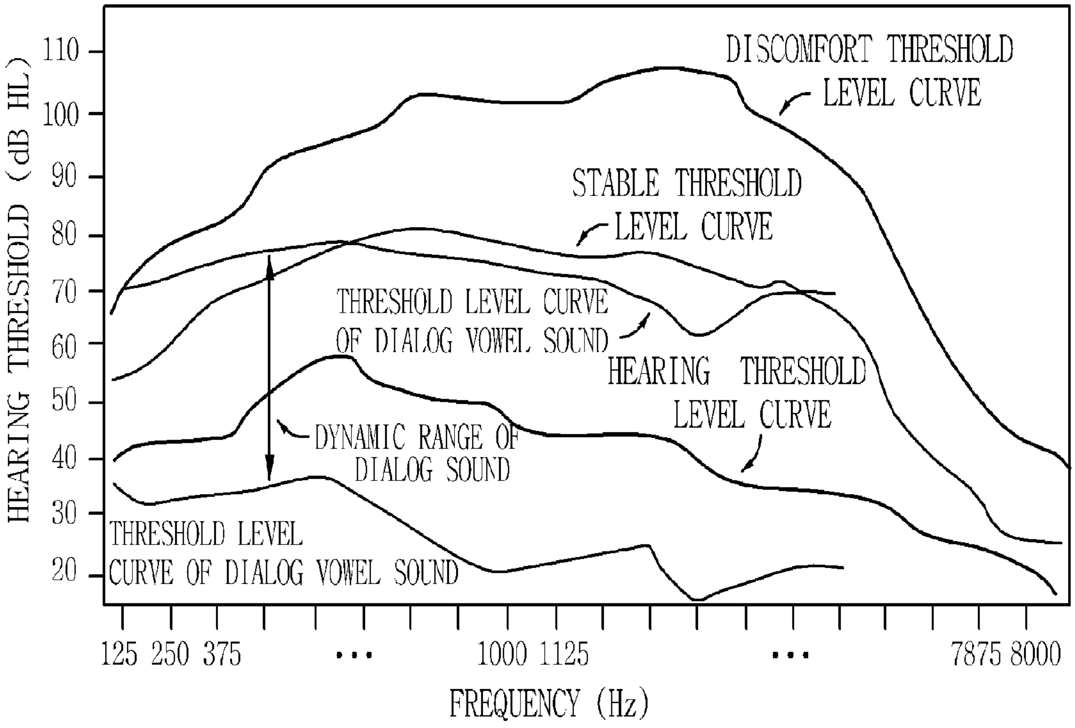
FIG. 20 is a graph conceptually showing hearing test results of a hard-of-hearing person and a dynamic range of a conversation sound according to a second embodiment of this invention.
Figure 21:
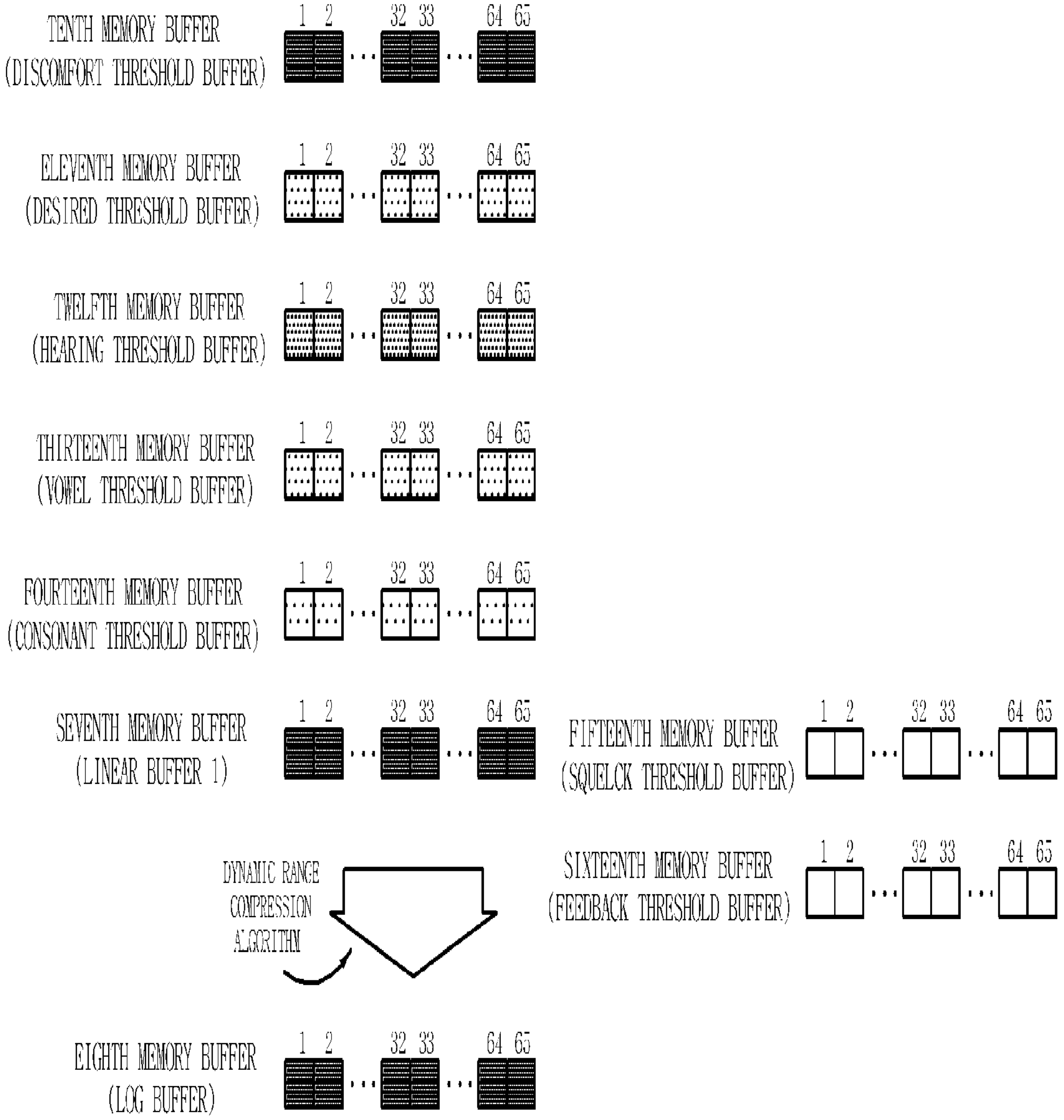
FIG. 21 is a conceptual view showing the entire operation of a dynamic range compression algorithm in a spectrum amplitude modulation algorithm according to a second embodiment of this invention.
Figure 22:
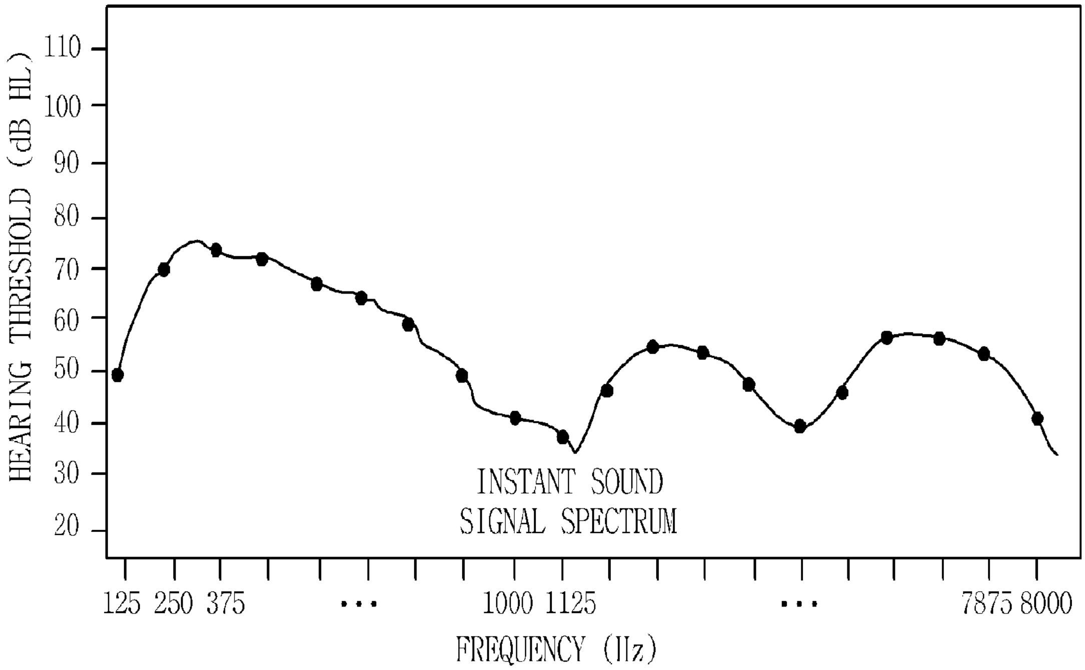
FIG. 22 is a graph conceptually showing a voice amplitude spectrum according to a second embodiment of this invention.
Figure 23:
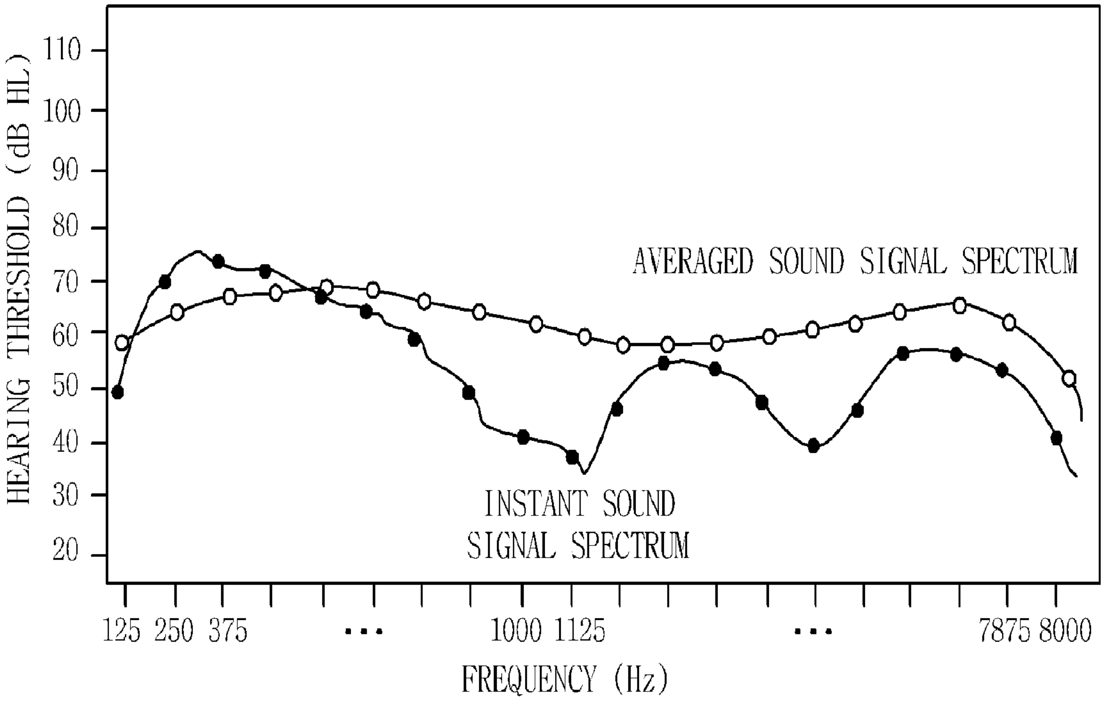
FIG. 23 is a graph conceptually showing a result of calculating an average value of a voice amplitude spectrum and comparing the average value of the voice amplitude spectrum with an instantaneous amplitude spectrum, according to a second embodiment of this invention.
Figure 24:
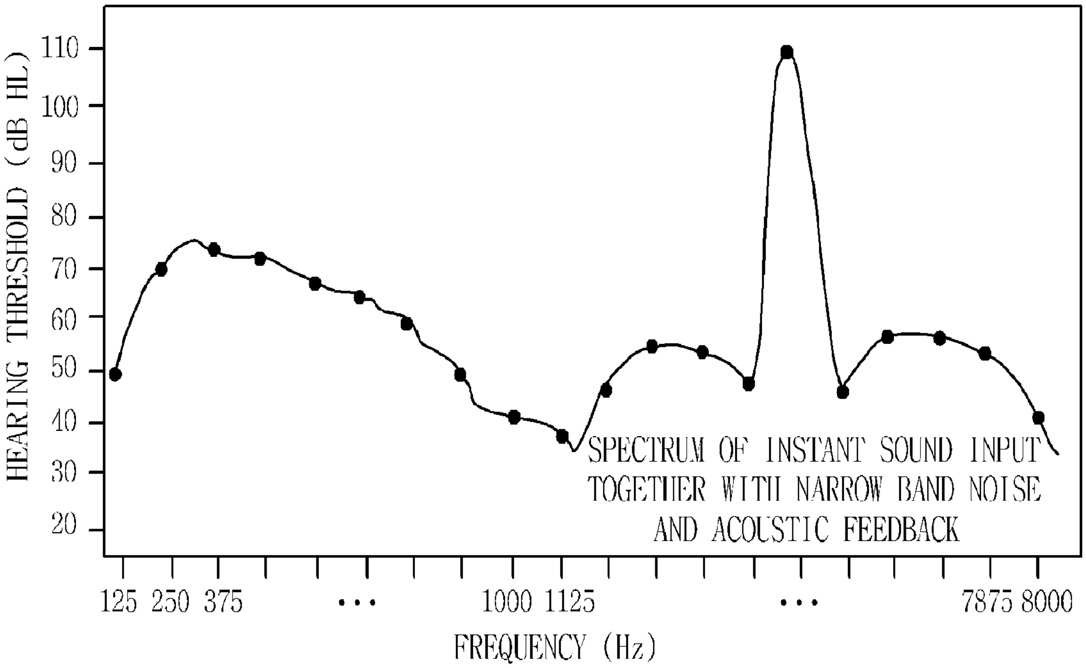
FIG. 24 is a graph conceptually showing an amplitude spectrum of the entire signal sound input together with a voice in the case that acoustic feedback or narrow-band noise occurs, according to a second embodiment of this invention.
Figure 25:
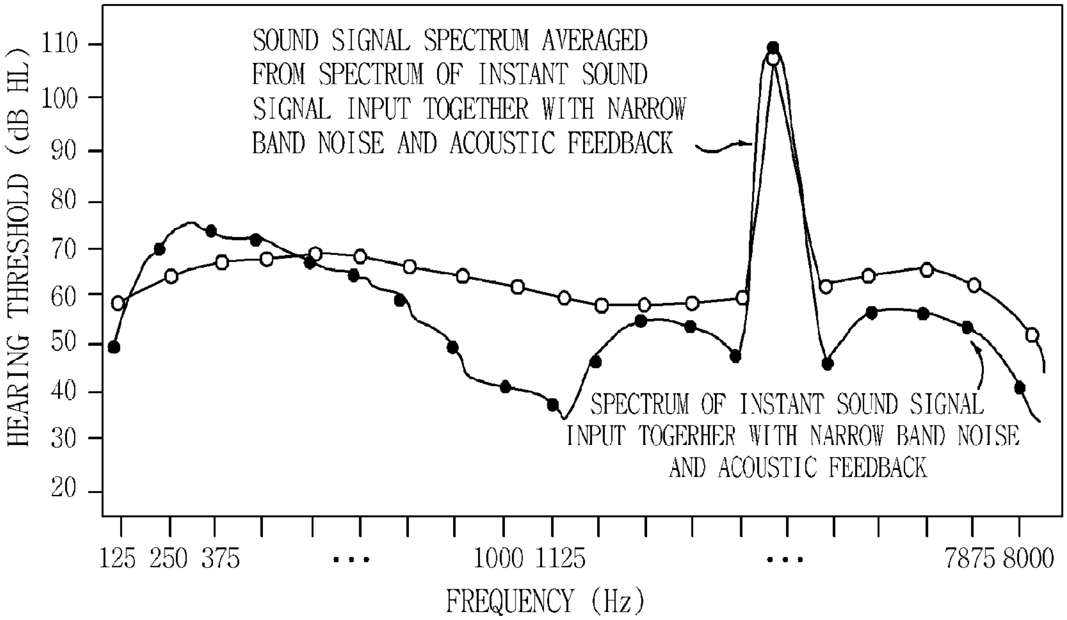
FIG. 25 is a graph conceptually showing an average value of an amplitude spectrum that appears when a voice amplitude spectrum is sharply changed due to acoustic feedback or narrow-band noise, according to a second embodiment of this invention.
Figure 26:
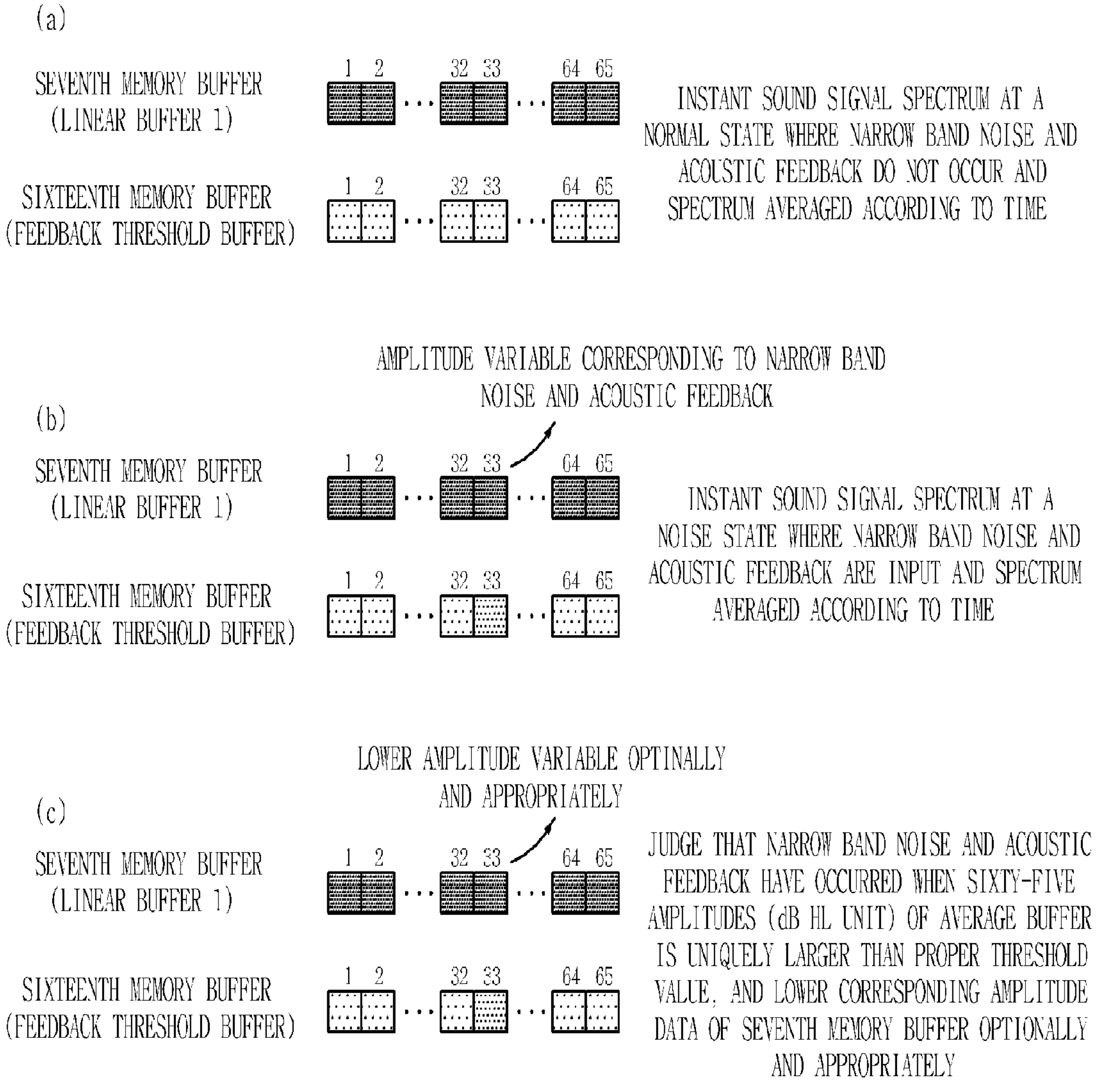
FIG. 26 is a conceptual view showing a corresponding digital signal processing operation when acoustic feedback or narrow-band noise occurs, according to a second embodiment of this invention.

By doing so, the amplitude spectrum of the signal having the specific spectrum different from the speech among the unwanted ambient noise such as the acoustic feedback or narrow-band noise that rapidly occurs is modulated. Here, the conversational sound means the typical conversational sound in the description of the present invention. In FIG. 8. a reference numeral 40 denotes a battery door.

As described above, the present invention has been described with respect to particularly preferred embodiments. However, the present invention is not limited to the above embodiments, and it is possible for one who has an ordinary skill in the art to make various modifications and variations, without departing off the spirit of the present invention. Thus, the protective scope of the present invention is not defined within the detailed description thereof but is defined by the claims to be described later and the technical spirit of the present invention.

The invention claimed is:

1. A hearing aid system comprising:

an analog-to-digital (A/D) converter that converts an analog input signal tone, that is, speaker's voice signals input from a microphone of the hearing aid system into a digital signal;

an input buffer memory that stores the digital input signal tone data output from the A/D converter, to then output the stored digital input signal tone data when the number of the stored digital input signal tone data is set as an integer N;

a first processor that fast Fourier transforms N input signal tone data output from the input buffer memory, and then executes nonlinear compression, wherein the nonlinear compression is performed by the following process that assuming the value of the amplitude increases in a sequence of the intensities IN1, IN2, IN3, and IN4 of the input sound IN in which IN1<IN2<IN3<IN4, where a region that is formed before IN1 is called a squelch region, a region that is formed between IN1 and IN2 is called a linear amplification region, a region that is formed between IN2 and IN3 is referred to as a non-linear amplification region, a region that is formed between IN3 and IN4 is called an automatic gain control region, and a region that is formed after IN4 is called a saturation region, a constant amplification is performed in the linear amplification region, the larger the intensity of the input signal may become, the smaller the amplification factor may be, in the non-linear amplification region, an amplification gain is sharply lowered before the intensity of the input signal reaches the saturation region of a receiver, in the automatic gain control region, to thus prevent distortion of the output sound, and as the intensity of the input sound may become smaller, the amplification gain should be lowered in the squelch region, in order to avoid the ambient small noise from being amplified;

a second processor that inverse fast Fourier transforms amplitude spectrum data that has been non-linear compressed and input from the first processor, and then outputs the inverse fast Fourier transformation result;

an output buffer memory that stores the voice signal tone data from which feedback noise has been removed from the second processor, until the number of the voice signal tone data is N, to then output the stored voice signal tone data;

a digital-to-analog (D/A) converter that converts the digital voice signal tone data from which feedback noise has been removed and that is output from the output buffer memory, into an analog signal, to then output the analog signal to the receiver; and a power supply unit for supplying power to the hearing aid system.

2. The hearing aid system according to claim 1, wherein the first processor comprises:

a FFT (fast Fourier transform) unit that fast Fourier transforms N input signal tone data output from the input buffer memory, to then transform the N input signal tone data from a time domain to a frequency domain and output the FFT result;

a decibel (dB) converter that calculates only an amplitude component separately from the input signal tone data that has been fast Fourier transformed by the FFT unit and then converts the amplitude component from a linear unit to a dB unit, to then output the dB unit conversion result;

an amplitude spectrum unit that changes a gain variation that independently increases or decreases an amplitude of the dB unit data output from the dB converter by frequency channels, to thus calculate and output N/2 amplitude spectrum;

a signal compressor that executes non-linear compression of the N/2 amplitude spectrum output from the amplitude spectrum unit, in accordance with a set stepwise control signal; and an adaptive notch filter that adaptively changes a gain of the non-linear compression signal for each frequency channel output from the signal compressor depending on an input signal level and outputs the adaptively changed gain.

3. The hearing aid system according to claim 1, wherein the second processor comprises:

a gain variation changer that increases or decreases the amplitude spectrum gain output from the adaptive notch filter under the control of a digital volume controller and then outputs the changed gain variations;

an equalizer that equalizes the output signal of the gain variation changer by a frequency domain according to settings of a user and then outputs the equalization result;

a maximum output limiter that differently sets a maximum output limit by a frequency to prevent distortion of the output signal equalized by the equalizer, and then output the differently set maximum output limit;

an inverse dB converter that inversely converts the dB unit amplitude spectrum data output from the maximum output limiter into a linear unit; and an inverse fast Fourier transform (iFFT) unit that inversely fast Fourier transforms the amplitude spectrum data that has been inversely converted by the inverse dB converter from a frequency domain to a time domain, and then outputs the iFFT result.

4. A control method for a hearing aid system comprising:

a first process of fast Fourier transforming N input signal tone data input from a microphone of a hearing aid system from a time domain to a frequency domain in a FFT (fast Fourier transform) unit;

a second process of calculating only an amplitude component separately from the input signal tone data that has been fast Fourier transformed in the first process, and converting the amplitude component from a linear unit to a dB unit in a decibel (dB) converter;

a third process of executing non-linear compression of the amplitude spectrum signal calculated after the second process, by a step set by a signal compressor, wherein the nonlinear compression is performed by the following process that assuming the value of the amplitude increases in a sequence of the intensities IN1, IN2, IN3, and IN4 of the input sound IN in which IN1<IN2<IN3<IN4, where a region that is formed before IN1 is called a squelch region, a region that is formed between IN1 and IN2 is called a linear amplification region, a region that is formed between IN2 and IN3 is referred to as a non-linear amplification region, a region that is formed between IN3 and IN4 is called an automatic gain control region, and a region that is formed after IN4 is called a saturation region, a constant amplification is performed in the linear amplification region, the larger the intensity of the input signal may become, the smaller the amplification factor may be, in the non-linear amplification region, an amplification gain is sharply lowered before the intensity of the input signal reaches the saturation region of a receiver, in the automatic gain control region, to thus prevent distortion of the output sound, and as the intensity of the input sound may become smaller, the amplification gain should be lowered in the squelch region, in order to avoid the ambient small noise from being amplified;

a fourth process of adaptively changing a gain of the non-linear compression signal for each frequency channel after the third process, depending on an input signal level and outputing the adaptively changed gain in an adaptive notch filter;

a fifth process of executing a gain variation change of the amplitude spectrum whose gain has been adaptively changed in the fourth process, and then inversely converting dB unit amplitude spectrum data whose maximum output has been limited into a linear unit in an inverse dB converter; and a sixth process of inversely fast Fourier transforming the inversely converted amplitude spectrum data in an inverse fast Fourier transform (iFFT) unit from a frequency domain to a time domain after the fifth process, and converting the digital voice signal tone data whose feedback noise has been removed into an analog signal, to then output the analog signal.

5. The control method of claim 4, further comprising a process of changing a gain variation that independently increases or decreases an amplitude of the dB unit data output from the dB converter by frequency channels, in an amplitude spectrum unit, to thus calculate and output N/2 amplitude spectrum, before the third process.

6. The control method of claim 4, wherein the process of changing the gain variation of the amplitude spectrum is a process of changing the gain variation of the amplitude spectrum under the control of a digital volume controller, and then outputting the gain variation change result in a gain variation changer.

7. The control method of claim 6, wherein the fifth process further comprises a process of equalizing the amplitude spectrum signal whose gain has been varied by a frequency domain according to settings of a user in an equalizer after the process of changing the gain variation of the amplitude spectrum.

8. The control method of claim 4, wherein the third process comprises a process of executing non-linear compression according to Equation 1 in order for a signal compressor to perform a primary adaptive amplification variation, $$G = \frac{(G2 - G1)}{(IN3 - IN2)} * (IN - IN2) + G1 \quad \text{[Equation 1]}$$

in which G is an amplification factor, IN is intensity of an input sound, G1 and G2 are an amplification level, respectively, and IN2 and IN3 are intensities of the input sound that define a non-linear amplification region.

9. The control method of claim 4, wherein the third process comprises a process of executing non-linear compression according to Equation 2 in order for a signal compressor to perform a secondary adaptive amplification variation, $$G = \frac{(G2 - G1)}{(IN3 - IN2')} * (IN - IN2') + G1 \quad \text{[Equation 2]}$$

in which G is an amplification factor, IN is intensity of an input sound, G1 and G2 are an amplification level, respectively, and IN2' and IN3 are intensities of the input sound that define a non-linear amplification region.

* * * * *